(12) United States Patent
Kono et al.

(10) Patent No.: US 11,650,703 B2
(45) Date of Patent: May 16, 2023

(54) DISPLAY DEVICE AND TOUCH DETECTION DEVICE

(71) Applicant: Japan Display Inc., Tokyo (JP)

(72) Inventors: Takaaki Kono, Tokyo (JP); Yoshio Owaki, Tokyo (JP); Makoto Hayashi, Tokyo (JP); Hiroyuki Miyake, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/930,717

(22) Filed: May 13, 2020

(65) Prior Publication Data

US 2020/0363906 A1    Nov. 19, 2020

(30) Foreign Application Priority Data

May 17, 2019   (JP) .............................. JP2019-093594

(51) Int. Cl.
*G06F 3/044* (2006.01)
*G06F 3/041* (2006.01)

(52) U.S. Cl.
CPC .......... *G06F 3/0445* (2019.05); *G06F 3/0416* (2013.01); *G06F 3/0448* (2019.05); *G06F 2203/0382* (2013.01); *G06F 2203/04101* (2013.01); *G06F 2203/04108* (2013.01)

(58) Field of Classification Search
None
See application file for complete search history.

(56) References Cited

U.S. PATENT DOCUMENTS

| | | | |
|---|---|---|---|
| 9,158,407 B2* | 10/2015 | Coulson | G06F 3/0445 |
| 9,785,283 B2 | 10/2017 | Noguchi et al. | |
| 2006/0279548 A1* | 12/2006 | Geaghan | G06F 3/0421 345/173 |
| 2012/0038583 A1* | 2/2012 | Westhues | G06F 3/04166 345/174 |
| 2012/0169628 A1* | 7/2012 | Kuo | G06F 3/0446 345/173 |
| 2013/0153391 A1* | 6/2013 | Liu | G06F 3/0443 200/600 |
| 2013/0271396 A1* | 10/2013 | Chen | G06F 3/04166 345/173 |
| 2014/0062933 A1* | 3/2014 | Coulson | G06F 3/0445 345/174 |

(Continued)

FOREIGN PATENT DOCUMENTS

| | | |
|---|---|---|
| JP | 2015164033 A | 9/2015 |
| JP | 2018088142 A | 6/2018 |

*Primary Examiner* — Dorothy Harris
(74) *Attorney, Agent, or Firm* — K&L Gates LLP

(57) ABSTRACT

An object of the present invention is to provide a technique for providing a detection function of detecting that an external approaching object approaches a sensor region of a touch sensor, without increasing an area of the touch sensor and making a circuit complex. According to an aspect, a display device includes a first detection electrode that detects a position of an external approaching object within a detection surface, and plural second detection electrodes that detect that the external approaching object approaches the detection surface. The second detection electrodes extend in a second direction and are arranged in a first direction intersecting the second direction. The second detection electrodes overlap the first detection electrode in a plan view.

17 Claims, 25 Drawing Sheets

(56) References Cited

U.S. PATENT DOCUMENTS

| | | | |
|---|---|---|---|
| 2014/0062934 A1* | 3/2014 | Coulson | G06F 3/0445 |
| | | | 345/174 |
| 2014/0139481 A1* | 5/2014 | Han | G06F 3/0446 |
| | | | 345/174 |
| 2015/0075959 A1* | 3/2015 | Lu | G06F 3/0445 |
| | | | 200/5 R |
| 2017/0115812 A1* | 4/2017 | Lin | G06F 3/0446 |
| 2017/0277341 A1* | 9/2017 | Lim | G06F 3/04166 |
| 2018/0095581 A1* | 4/2018 | Hwang | H01L 27/323 |
| 2018/0150166 A1 | 5/2018 | Aoki et al. | |
| 2018/0232102 A1* | 8/2018 | Ko | G06F 3/0442 |
| 2019/0220144 A1* | 7/2019 | Ko | G06F 3/0418 |

* cited by examiner

DISPLAY DEVICE AND TOUCH DETECTION DEVICE

CLAIM OF PRIORITY

The present application claims priority from Japanese Patent Application JP 2019-93594 filed on May 17, 2019, the content of which is hereby incorporated by reference into this application.

BACKGROUND OF THE INVENTION

The present invention relates to a display device having a touch detection device, and a touch detection device.

A display device having a touch panel has been proposed (for example, Japanese Unexamined Patent Application Publication No. 2018-88142). In addition, an in-cell liquid crystal display device including a touch panel in a liquid display panel has been proposed (for example, Japanese Unexamined Patent Application Publication No. 2015-164033).

SUMMARY OF THE INVENTION

The present inventors have considered lowering power consumption of a touch sensor having a detection function (first touch detection function) of detecting the position of an external approaching object such as a finger or a touch pen. As a result, for low power consumption of the touch sensor, it has been found that it is better to cause the touch sensor to further include a detection function (second touch detection function) of detecting that an external approaching object such as a finger or a touch pen approaches a touch sensor region, and activate the first touch detection function based on the detection result of the second touch detection function to detect the position of the external approaching object. In addition, it has been found that it is better to cause the touch sensor to include the second touch detection function without an increase in the area of the touch sensor.

An object of the present invention is to provide a technique for providing a detection function of detecting that an external approaching object approaches a touch sensor region of a touch sensor without increasing the area of the touch sensor or making a circuit complex.

Other challenges and new characteristics will be clarified from the following description of the present specification and the accompanying drawings.

A representative overview of the present invention is briefly described as follows.

According to an aspect, a display device includes a first detection electrode that detects a position of an external approaching object within a detection surface, and plural second detection electrodes that detect that the external approaching object approaches the detection surface. The second detection electrodes extend in a second direction and are arranged in a first direction intersecting the second direction. The second detection electrodes overlap the first detection electrode in a plan view.

According to another aspect, a touch detection device includes a first detection electrode that detects a position of an external approaching object within a detection surface, and plural second detection electrodes that detect that the external approaching object approaches the detection surface. The second detection electrodes extend in a second direction and are arranged in a first direction intersecting the second direction. Each of the second detection electrodes overlaps the first detection electrode in a plan view.

DETAILED DESCRIPTION OF THE PREFERRED EMBODIMENT

Figure 1:
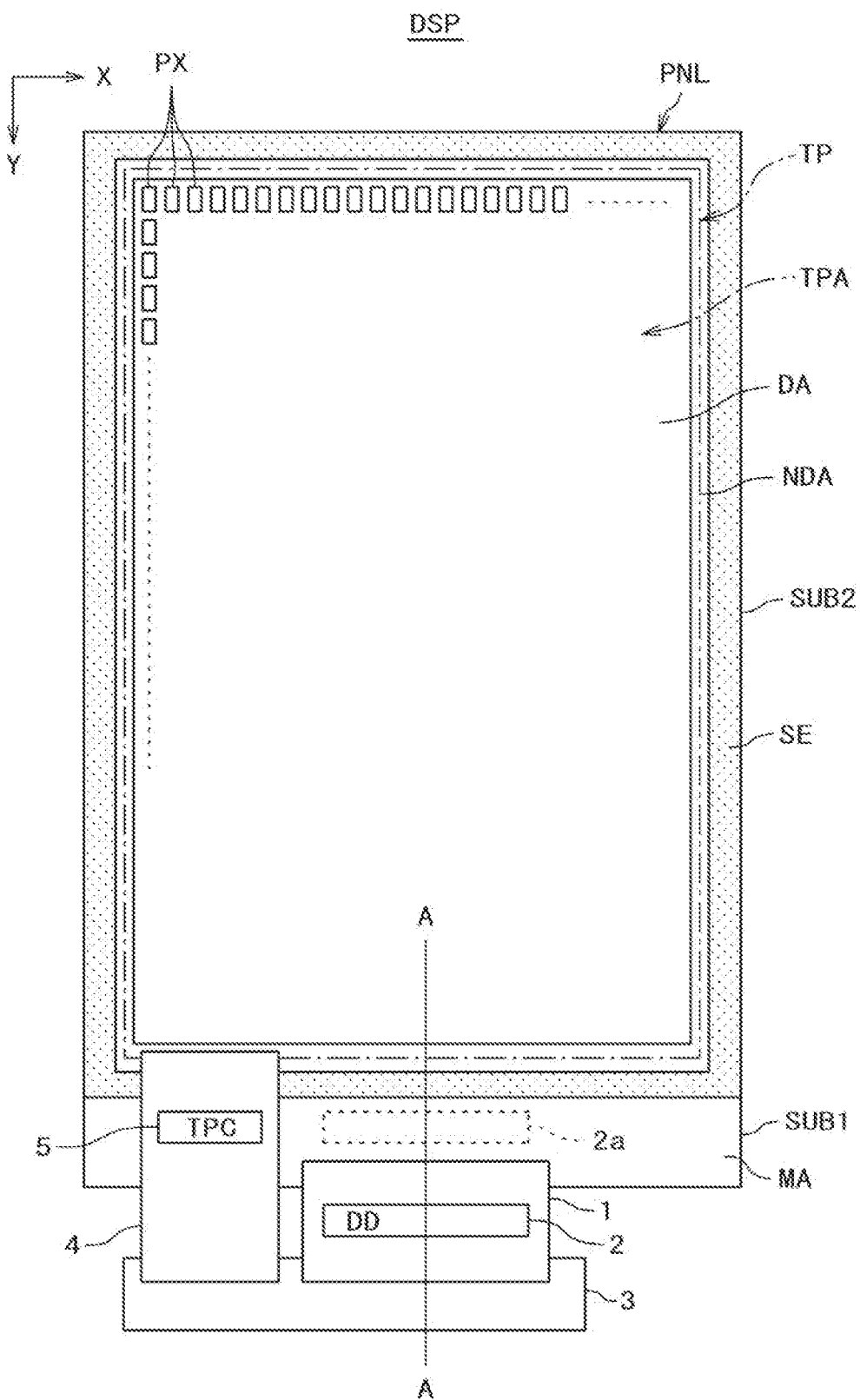
FIG. 1 is a plan view describing a display device according to an embodiment.

Hereinafter, an embodiment of the present invention is described with reference to the drawings.

The disclosure is merely an example, and the present invention naturally encompasses an appropriate modification that maintains the gist of the present invention and is easily conceivable by a person skilled in the art. To further clarify the description, a width, a thickness, a shape, and the like of each component may be schematically illustrated in the drawings as compared with an actual aspect. However, the drawings are merely examples and do not limit interpretation of the present invention.

In the present specification and each of the drawings, the same element as the one described with reference to the drawing already described is denoted by the same reference sign throughout the present specification and the drawings, and a detailed description thereof is omitted in some cases.

The embodiment describes a liquid crystal display device as an example of a display device. For example, the liquid crystal display device can be used for various electronic devices, such as a smartphone, a tablet terminal, a mobile phone terminal, a personal computer, a television image receiving device, an in-vehicle device, a game machine, and the like.

In the present specification and the claims, "upper" and "lower" that are words used to explain the drawings indicate relative positional relationships between concerned structural bodies and other structural bodies. Specifically, a direction from a first substrate (array substrate) to a second substrate (opposing substrate) is defined as "upper" and the opposite direction to the foregoing direction is defined as "lower" when viewed laterally.

In addition, an "inner side" and an "outer side" indicate relative positional relationships between two portions using a display region as a reference. Specifically, the "inner side" indicates the side relatively closer to the display region with respect to one of the portions, and the "outer side" indicates the side relatively farther away from the display region with respect to one of the portions. The "inner side" and the "outer side" are defined in a state in which the liquid crystal display device is not folded.

A "display device" indicates a display device that displays a video image using a display panel. The "display panel" indicates a structural body for displaying a video image using an electro-optical layer. For example, the term "display panel" may indicate a display cell including an electro-optical layer or indicate a structural body having another optical member (for example, a deflection member, a backlight, a touch panel, or the like) for a display cell. The "electro-optical layer" may include a liquid crystal layer, an electrochromic (EC) layer, an organic light-emitting diode (OLED), a micro LED (μLED), and the like unless there is a technical contradiction. Therefore, although the embodiment describes a liquid crystal panel including a liquid crystal layer as the display panel as an example below, but does not exclude application to the foregoing other display panel including the electro-optical layer.

Embodiment

Figure 2:
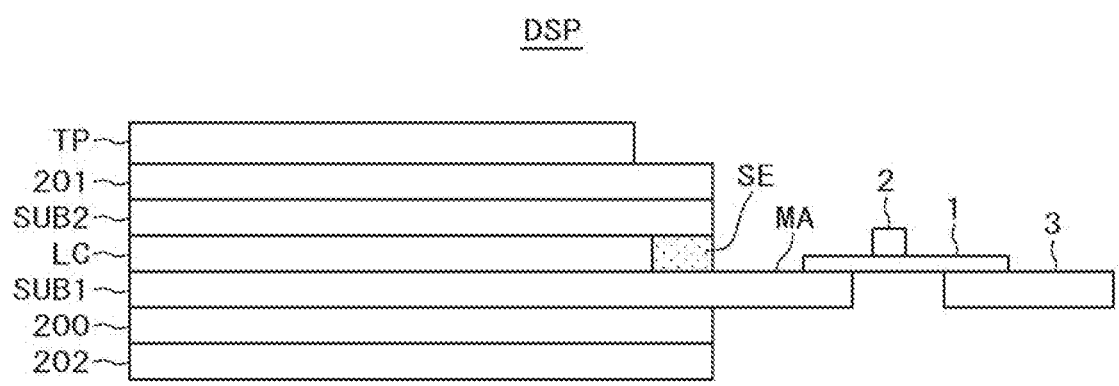
FIG. 2 is a cross-sectional view taken along an A-A line illustrated in FIG. 1.
Figure 3:
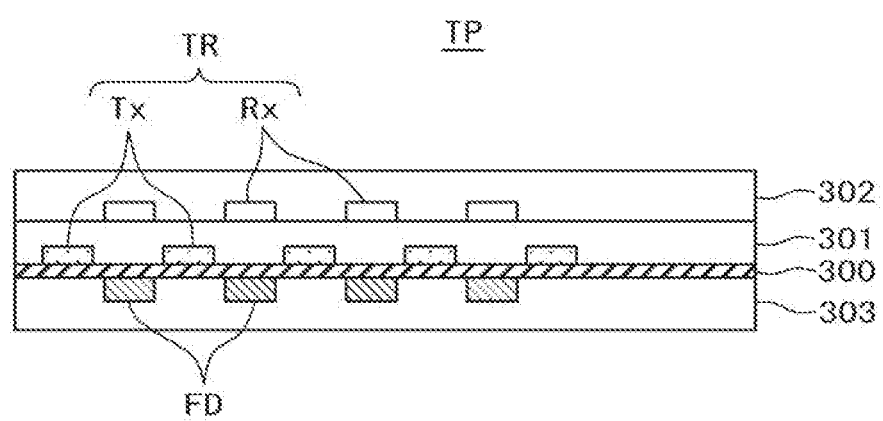
FIG. 3 is a cross-sectional view describing a configuration example of a touch panel illustrated in FIG. 2.
Figure 4:
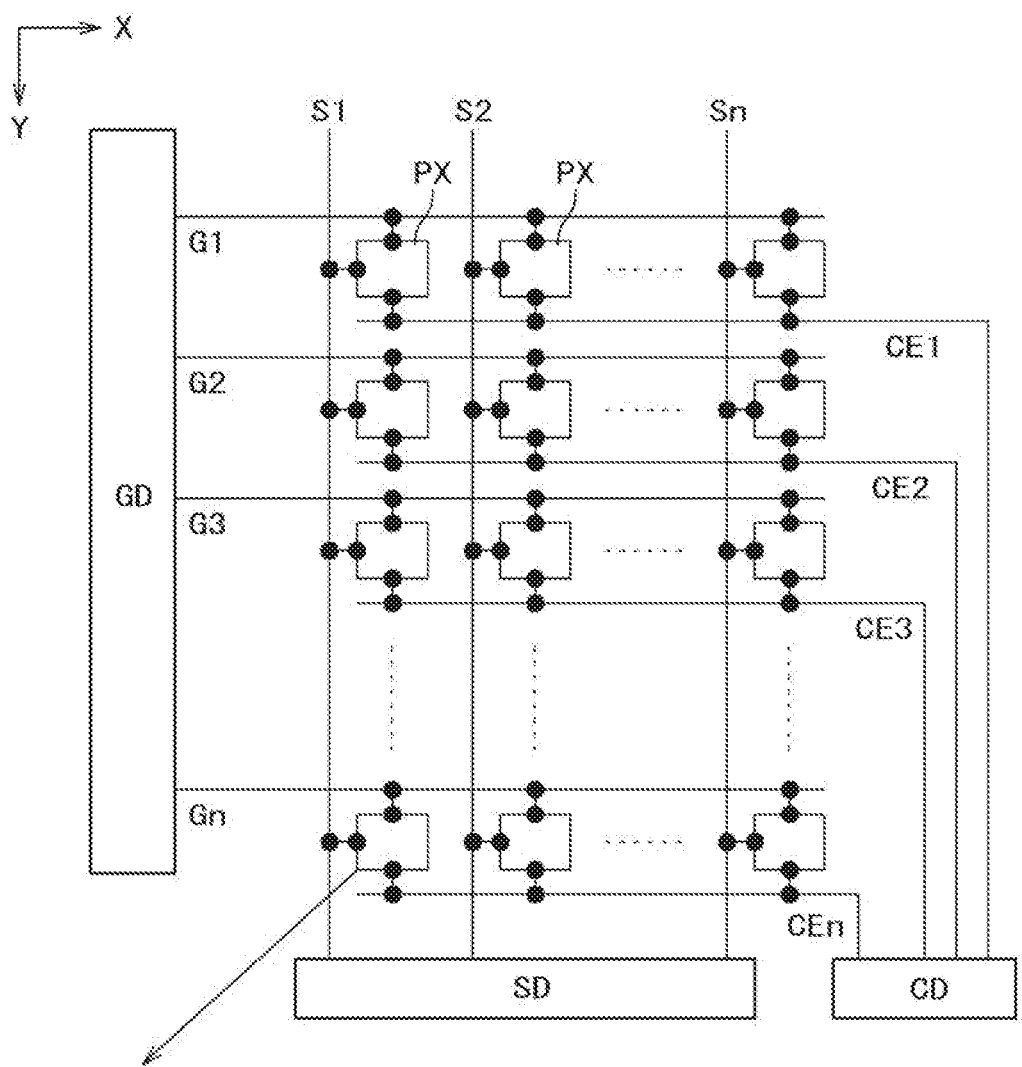
FIG. 4 is a diagram illustrating a basic configuration of an equivalent circuit of the display device illustrated in FIG. 1 and a pixel of the display device illustrated in FIG. 1.
Figure 4:
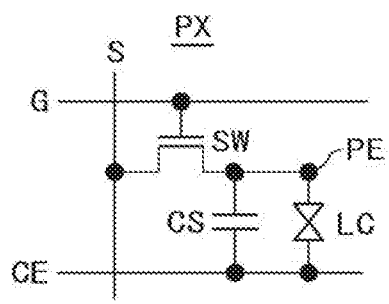

FIG. 1 is a plan view describing a display device according to the embodiment. FIG. 2 is a cross-sectional view taken along an A-A line illustrated in FIG. 1. FIG. 3 is a cross-sectional view describing a configuration example of a touch panel. FIG. 4 is a diagram describing a circuit configuration example of the display device illustrated in FIG. 1.

Example of Entire Configuration of Display Device

As illustrated in FIG. 1, the display device DSP includes a display panel PNL, a touch panel TP as a touch detection device, a flexible printed circuit board 1, an IC chip (DD) 2, a circuit board 3, a flexible printed circuit board 4, and a touch panel control device (TPC) 5. In this example, the display panel PNL is a liquid crystal panel and includes a first substrate (also referred to as array substrate) SUB1, a second substrate (also referred to as opposing substrate) SUB2, a liquid crystal layer LC described later, and a sealing member SE.

The display panel PNL includes a display area (display region) DA for displaying an image, and a frame-shaped non-display area (non-display region) NDA surrounding the display area DA. The second substrate SUB2 is arranged opposite to the first substrate SUB1. The first substrate SUB1 includes a mounting area MA protruding more than the second substrate SUB2 in a second direction Y. The sealing member SE exists in the non-display area NDA, bonds the first substrate SUB1 and the second substrate SUB2 together, and seals the liquid crystal layer LC. The non-display area NDA can also be treated as a peripheral region. The mounting area MA can be included in the non-display area NDA.

The display area DA includes plural pixels PX, plural gate lines (also referred to as scanning lines), and video signal lines (also referred to as signal lines). In the display area DA, the pixels PX are arranged in a matrix form in a first direction X and the second direction Y. The pixels PX are electrically connected to the gate lines and the video signal lines so that each pixel PX is electrically connected to a single gate line and a single video signal line.

The flexible printed circuit board 1 is mounted on the mounting area MA and connected to the circuit board 3. The IC chip 2 is mounted on the flexible printed circuit board 1. The IC chip 2 may be mounted on the mounting area MA as indicated by a dotted square 2a. The IC chip 2 includes a display driver DD for outputting a signal necessary to display an image in a display mode for displaying an image.

The touch panel TP includes a touch sensor area TPA. The touch sensor area TPA is located on the upper side of the display area (display region) DA of the display panel PNL. In the touch sensor area TPA, the touch panel TP has a function (also referred to as first touch detection function) of performing first touch detection to detect the position of an external approaching object such as a finger or a touch pen, and a function (also referred to as second touch detection function) of performing second touch detection to detect that the external approaching object such as the finger or the touch pen approaches the touch sensor region. The first touch detection function is constituted by a first touch detection electrode TR including plural driving electrodes Tx and plural detection electrodes Rx. The second touch detection function is constituted by plural second touch detection electrodes FD.

The flexible printed circuit board 4 is mounted between the touch panel TP and the circuit board 3. The touch panel control device (TPC) 5 is mounted on the flexible printed circuit board 4 and electrically connected to the touch panel TP. The touch panel control device 5 is electrically connected to the IC chip 2 via the flexible printed circuit board 4, the circuit board 3, and the flexible printed circuit board 1. The touch panel control device 5 controls the driving electrodes Tx and the detection electrodes Rx to perform the first touch detection and controls the second touch detection electrodes to perform the second touch detection.

The display panel PNL according to the embodiment is a transmissive panel having a transmissive display function of selectively transmitting light from a back surface of the first substrate SUB1 to display an image, a reflection panel having a reflection display function of selectively reflecting light from a front surface of the second substrate SUB2 to display an image, or a semi-transmissive panel having the transmissive display function and the reflection display function.

Although a description of a detailed configuration of the display panel PNL is omitted, the display panel PNL may have a display mode using a vertical electric field applied in a normal direction to a substrate main surface, a display mode using an electric field inclined with respect to the substrate main surface, and a display mode using a combination of a transverse electric field, the vertical electric field, and the inclined electric field. The substrate main surface is a surface parallel to an X-Y plane defined by the first direction X and the second direction Y As illustrated in FIG. 2, a lower polarization plate 200 is attached to the first substrate SUB1 on the lower side of the first substrate SUB1, and an upper polarization plate 201 is attached to the second substrate SUB2 on the upper side of the second substrate SUB2. The touch panel TP is attached onto the upper polarization plate 201. A combination of the first substrate SUB1, the second substrate SUB2, the lower polarization plate 200, the upper polarization plate 201, and the liquid crystal layer LC is referred to as the display panel PNL in some cases. When the display panel PNL is a non-self-luminous panel using liquid crystal or the like, a backlight 202 is mounted on the lower side of the lower polarization plate 200. An upper surface of the touch panel TP serves as a detection surface.

As described with reference to FIG. 1, plural external terminals are formed in the mounting area MA. The flexible printed circuit board 1 is connected to the external terminals of the mounting area MA. The IC chip 2 for supplying a video signal or the like is mounted on the flexible printed circuit board 1. The circuit board 3 for supplying a signal and power from an external to the display device DSP is connected to the flexible printed circuit board 1.

FIG. 3 is a cross-sectional view of an example of the touch panel TP in the first direction X. As illustrated in FIG. 3, the touch panel TP includes an insulating substrate 300, the driving electrodes Tx mounted on an upper surface of the insulating substrate 300, an insulating layer 301 covering the driving electrodes Tx, the detection electrodes Rx mounted on the insulating layer 301, and an insulating layer 302 covering the detection electrodes Rx. The detection electrodes Rx and the driving electrodes Tx being comprised in the first touch detection electrode TR. The touch panel TP also includes the second touch detection electrodes FD mounted on a lower surface of the insulating substrate 300, and an insulating layer 303 covering the second touch detection electrodes FD. Each of the driving electrodes Tx, the detection electrodes Rx, and the second touch detection electrodes FD is made of a transparent conductive material, such as an indium tin oxide (ITO) or an indium zinc oxide (IZO), or a conductive material, such as metal.

Example of Circuit Configuration of Display Device

FIG. 4 is a diagram illustrating a basic configuration of an equivalent circuit of the display device DSP and a pixel PX of the display device DSP. The pixels PX are arranged in a matrix form in the first direction X and the second direction Y. A plurality of scanning lines G (G1, G2, . . . ) are connected to a scanning line driving circuit GD. A plurality of signal lines S (S1, S2, . . . ) are connected to a signal line driving circuit SD. A plurality of common electrodes CE (CE1, CE2, . . . ) are connected to a voltage supply section CD of a common voltage (Vcom) and arranged across the pixels PX. Each of the pixels PX is connected to a single scanning line G, a single signal line S, and a single common electrode CE. The scanning lines G and the signal lines S may not linearly extend and may be partially bent. For example, even when the signal lines S are partially bent, the signal lines S extend in the second direction Y The scanning line driving circuit GD, the signal line driving circuit SD, and the voltage supply section CD are comprised in thin-film transistors (TFTs).

Each of the pixels PX includes a switching element SW, a pixel electrode PE, a common electrode CE, a liquid crystal layer LC, and the like. The switching element SW is comprised, for example, a thin-film transistor (TFT) being electrically connected to a scanning line G and a signal line S. Each of the scanning lines G is connected to the switching elements SW of the pixels PX arranged in the first direction X. Each of the signal lines S is connected to the switching elements SW of the pixels PX arranged in the second direction Y. The pixel electrodes PE are electrically connected to the switching elements SW, respectively. The pixel electrodes PE are arranged opposite to the common electrodes CE, respectively, and drive the liquid crystal layers LC using electric fields generated between the pixel electrodes PE and the common electrodes CE. Storage capacitors CS are, for example, formed between electrodes at the same potential as the common electrodes CE and electrodes at the same potential as the pixel electrodes PE.

Configuration Example of Planar Layout of Touch Panel

Figure 5:
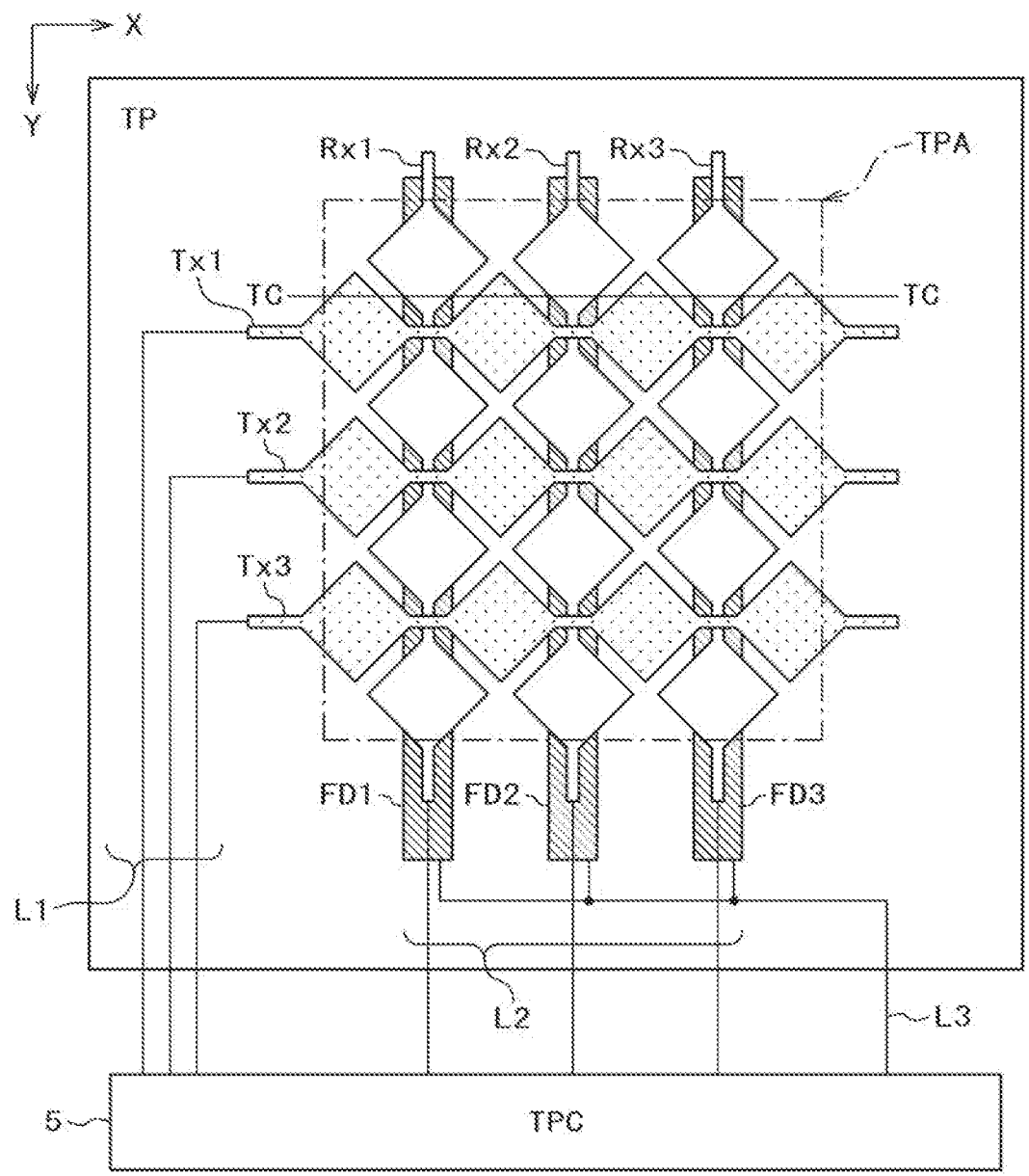
FIG. 5 is a diagram illustrating a configuration example of a planer layout of the touch panel.

FIG. 5 is a diagram illustrating a configuration example of a planar layout of the touch panel TP. The touch panel TP includes the plural driving electrodes Tx (Tx1, Tx2, and Tx3), the plural detection electrodes Rx (Rx1, Rx2, and Rx3), and the plural second detection electrodes FD (FD1, FD2, and FD3) in the touch sensor area TPA. Although FIG. 5 exemplifies the three driving electrodes (Tx1, Tx2, and Tx3), the three detection electrodes (Rx1, Rx2, and Rx3), and the three second detection electrodes (FD1, FD2, and FD3), the electrodes are not limited to this. A person skilled in the art can easily conceive that the number of driving electrodes Tx, the number of detection electrodes Rx, and the number of second detection electrodes FD may be 4 or more.

The driving electrodes Tx (Tx1, Tx2, and Tx3) extend in the first direction X and are arranged in the second direction Y intersecting the first direction X in a plan view. The detection electrodes Rx (Rx1, Rx2, and Rx3) extend in the second direction Y and are arranged in the first direction X intersecting the second direction Y in the plan view. The second detection electrodes FD (FD1, FD2, and FD3) have a stripe-shaped electrode structure. The second detection electrodes FD (FD1, FD2, and FD3) extend in the second direction Y and are arranged in the first direction X intersecting the second direction Y in the plan view. In this example, the second detection electrodes FD (FD1, FD2, and FD3) are arranged on the lower side of the detection electrodes Rx (Rx1, Rx2, and Rx3). Specifically, the second detection electrode FD1 is arranged on the lower side of the detection electrode Rx1, the second detection electrode FD2 is arranged on the lower side of the detection electrode Rx2, and the second detection electrode FD3 is arranged on the lower side of the detection electrode Rx3.

Therefore, as illustrated in FIG. 5, the second detection electrodes FD overlap the first detection electrode TR comprising the driving electrodes Tx and the detection electrodes Rx. The areas of overlapping portions of the second detection electrodes FD and the detection electrodes Rx are larger than the area of overlapping portions of the second detection electrodes FD and the driving electrodes Tx.

The driving electrodes Tx (Tx1, Tx2, and Tx3) are electrically connected to the touch panel control device 5 via plural lead lines L1. The detection electrodes Rx (Rx1, Rx2, and Rx3) are electrically connected to the touch panel control device 5 via plural lead lines L2. The second detection electrodes FD (FD1, FD2, and FD3) are electrically connected to the touch panel control device 5 via a lead line L3.

The second detection electrodes FD (FD1, FD2, and FD3) are arranged on the lower side of the detection electrodes Rx (Rx1, Rx2, and Rx3) so as not to increase area of the touch panel TP. The second touch detection electrodes FD are used for detecting an external approaching object that approaches to the touch sensor area TPA of the touch panel TP.

Figure 6:
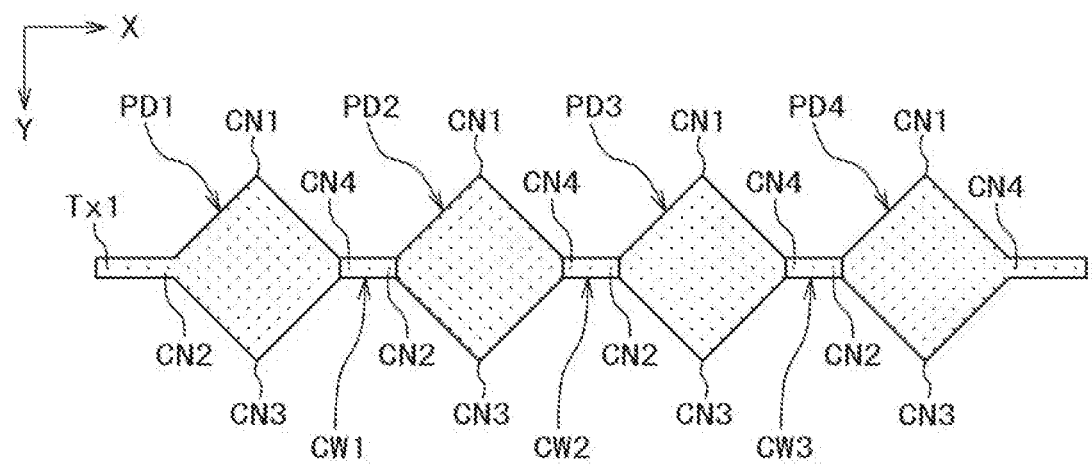
FIG. 6 is a diagram describing an electrode shape of a driving electrode illustrated in FIG. 5.

The driving electrode Tx1 is described as a representative example with reference to FIG. 6 to explain the shapes of the driving electrodes Tx (Tx1, Tx2, and Tx3). FIG. 6 is a diagram describing an electrode shape of the driving electrode Tx1 illustrated in FIG. 5. The driving electrode Tx1 includes plural pads PD1 to PD4 and plural connection lines CW1 to CW3. Each of the pads PD1 to PD4 is formed in a square shape in a plan view and includes a first corner CN1, a second corner CN2, a third corner CN3 arranged opposite to the first corner CN1, and a fourth corner CN4 arranged opposite to the second corner CN2.

The fourth corner CN4 of the pad PD1 is connected to the second corner CN2 of the pad PD2 via the connection line CW1. The fourth corner CN4 of the pad PD2 is connected to the second corner CN2 of the pad PD3 via the connection line CW2. The fourth corner CN4 of the pad PD3 is connected to the second corner CN2 of the pad PD4 via the connection line CW3.

Figure 7:
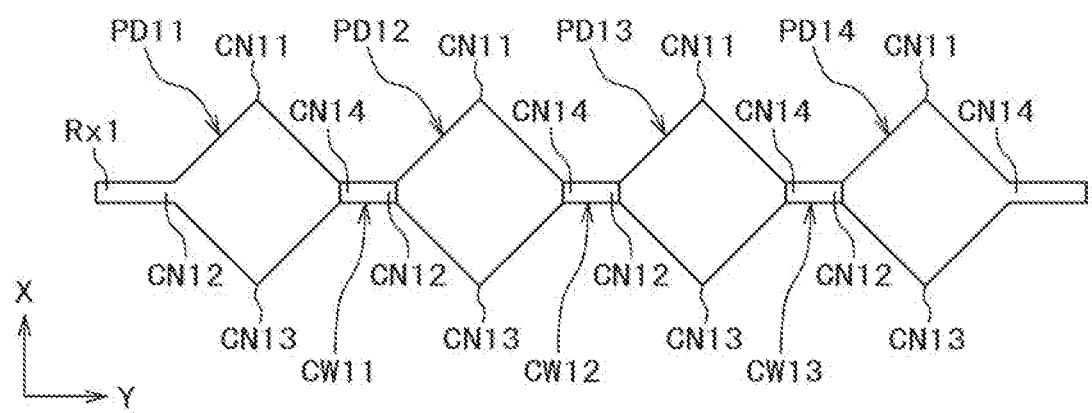
FIG. 7 is a diagram describing an electrode shape of a detection electrode illustrated in FIG. 5.

The detection electrode Rx1 is described as a representative example with reference to FIG. 7 to explain the shapes of the driving electrodes Tx (Tx1, Tx2, and Tx3). FIG. 7 is a diagram describing an electrode shape of the detection electrode Rx1 illustrated in FIG. 5. The detection electrode Rx1 includes plural pads PD11 to PD14 and plural connection lines CW11 to CW13. Each of the pads PD11 to PD14 is formed in a square shape in a plan view and includes a first corner CN11, a second corner CN12, a third corner CN13 arranged opposite to the first corner CN11, and a fourth corner CN14 arranged opposite to the second corner CN12.

The fourth corner CN14 of the pad PD11 is connected to the second corner CN12 of the pad PD12 via the connection line CW11. The fourth corner CN14 of the pad PD12 is connected to the second corner CN12 of the pad PD13 via the connection line CW12. The fourth corner CN14 of the pad PD13 is connected to the second corner CN12 of the pad PD14 via the connection line CW13.

In FIG. 5, when the pads PD11 to PD14 comprised in the detection electrodes Rx illustrated in FIG. 7 are formed in a first transparent conductive layer, and the pads PD1 to PD4 comprised in the driving electrodes Tx illustrated in FIG. 6 are formed in a second transparent conductive layer mounted on the first transparent conductive layer, the connection lines CW1 to CW3 illustrated in FIG. 6 can be formed in the same second transparent conductive layer as the pads PD1 to PD4 comprised in the driving electrodes Tx.

In FIG. 5, on the other hand, when the pads PD1 to PD4 comprised in the driving electrodes Tx illustrated in FIG. 6 and the pads PD11 to PD14 comprised in the detection electrodes Rx illustrated in FIG. 7 are formed in the same first transparent conductive layer, the connection lines CW1 to CW3 illustrated in FIG. 6 can be constituted by bridge lines using the second transparent conductive layer mounted above the first transparent conductive layer via an insulating layer. Instead of the first and second transparent conductive layers, non-transparent or semi-transparent conductive layers may be used.

First Touch Detection

Next, the first touch detection by the touch panel TP used for the display device DSP with a sensor is described. As methods of performing the first touch detection to detect the position and coordinates of an external approaching object such as a user's finger or a pen with respect to the touch sensor area TPA of the touch panel TP, there are a mutual detection method and a self-detection method.

Mutual Detection Method

Figure 8:
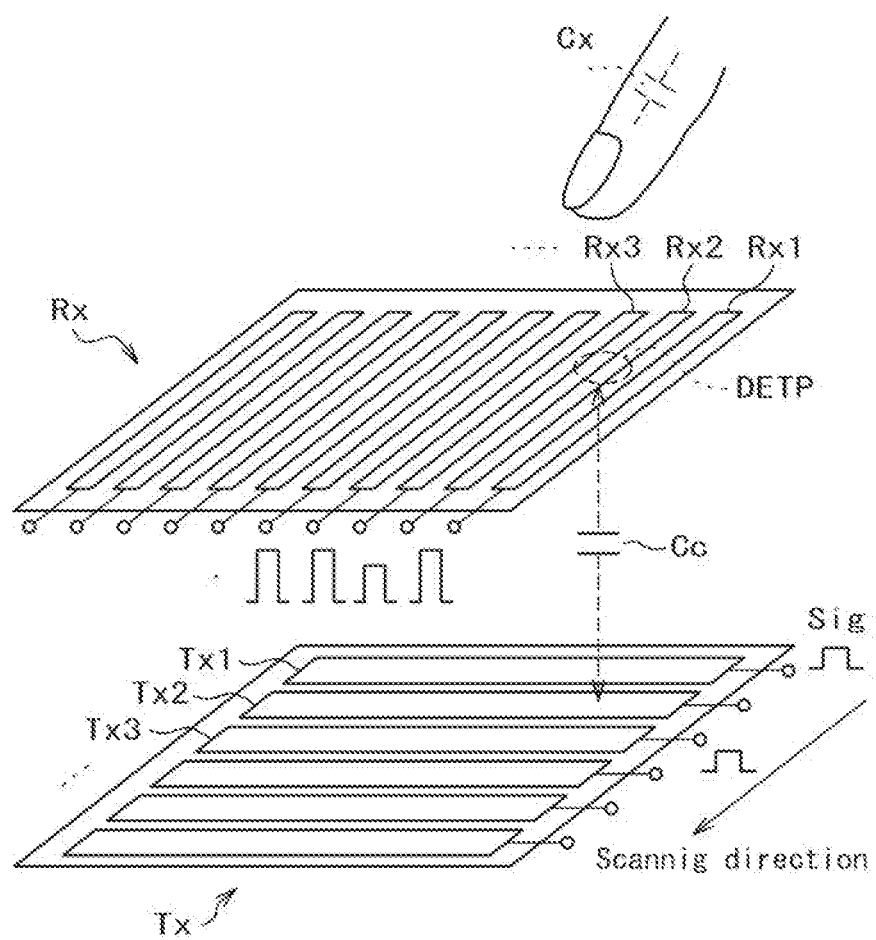
FIG. 8 is a diagram illustrating a representative basic configuration for a mutual detection method of a display device with a sensor according to the embodiment.

FIG. 8 is a diagram illustrating a representative basic configuration for the mutual detection method of the display device with the sensor according to the embodiment. As the sensor, the driving electrodes Tx and the detection electrodes Rx are used.

The driving electrodes Tx include plural driving electrodes Tx (Tx1, Tx2, Tx3, . . . ).

The driving electrodes Tx are illustrated as a stripe shape in this example. The driving electrodes Tx1, Tx2, Tx3, . . . are arranged in a scanning (driving) direction (second direction Y or first direction X). Each of the shapes of the driving electrodes Tx may be the same as the shapes of the driving electrodes Tx illustrated in FIGS. 5 and 6.

The detection electrodes Rx include plural detection electrodes Rx (Rx1, Rx2, Rx3, . . . ). The detection electrodes Rx are illustrated as a stripe shape, for example. The detection electrodes Rx (Rx1, Rx2, Rx3, . . . ) are arranged in the direction (first direction X or second direction Y) perpendicular to or intersecting the driving electrodes Tx. Each of the shapes of the detection electrodes Rx may be the same as the shapes of the detection electrodes Rx illustrated in FIGS. 5 and 7.

The driving electrodes Tx and the detection electrodes Rx are arranged at intervals. Therefore, capacitors Cc as capacitances basically exist between the driving electrodes Tx and the detection electrodes Rx.

A driving pulse (alternating-current signal) is applied to the driving electrodes Tx in a first touch detection period (detection period). The detection electrodes Rx receive signals from the driving electrodes Tx.

In touch detection, the driving electrodes Tx (Tx 1, Tx2, Tx3, . . . ) are scanned based on the driving pulse (Sig) at predetermined time intervals. It is assumed that a user's finger approaches an intersection of the detection electrode Rx2 and the driving electrode Tx2 and exists near the intersection. In this case, when the driving pulse (Sig) is supplied to the driving electrode Tx2, a pulse-like waveform is obtained for the detection electrodes Rx (Rx1, Rx2, Rx3, ... ). For the detection electrode Rx2, a pulse with an amplitude level lower than any other amplitude levels of the other detection electrodes is obtained. The detection electrodes Rx (Rx1, Rx2, Rx3, ... ) monitor fringe electric fields from the driving electrodes Tx (Tx1, Tx2, Tx3, ... ). When the conductive object such as the finger approaches, an effect of blocking a fringe electric field occurs. By blocking the fringe electric field, a detection potential of a detection electrode Rx decreases.

In the mutual detection, a difference between detection potentials can be treated as a detection pulse for a position DETP. A capacitor Cx illustrated varies depending on whether the distance between the user's finger and the detection electrode Rx is long or short. Therefore, the level of the detection pulse varies depending on whether the distance between the user's finger and the detection electrode Rx is long or short. Accordingly, a degree at which the finger approaches the flat surface of the touch panel can be determined based on the amplitude level of the detection pulse. A two-dimensional position of the finger on the flat surface of the touch panel can be detected based on the timing of driving the electrodes using the driving pulse Sig and the timing of outputting the detection pulse.

Self-Detection Method

Figure 9:
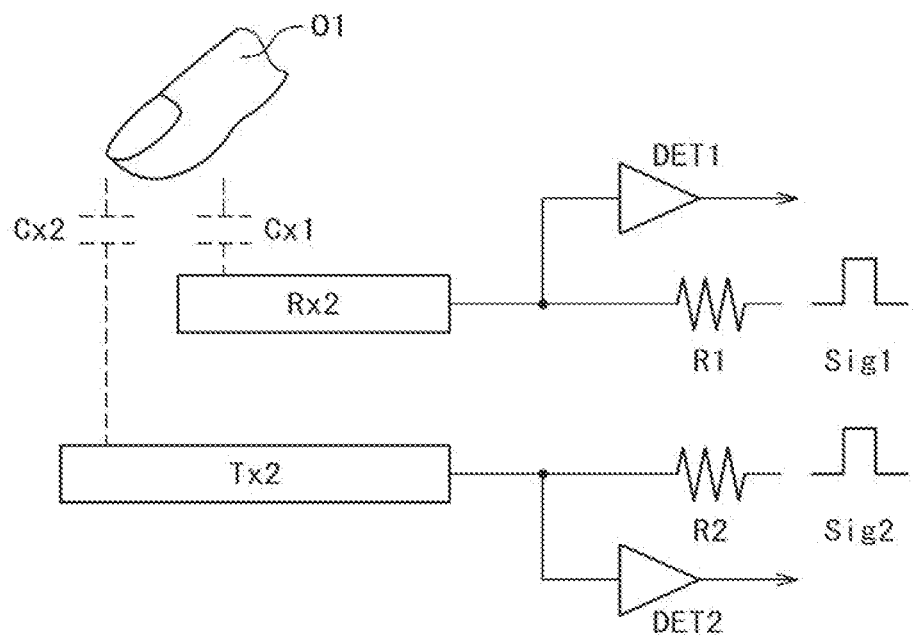
FIG. 9 is a diagram illustrating a representative basic configuration for a self-detection method according to the embodiment.

FIG. 9 is a diagram illustrating a representative basic configuration for the self-detection method. In the self-detection method, the electrodes Rx and the electrodes Tx are used as detection electrodes. In the self-detection method, in a first touch detection period (detection period), a self-detection driving pulse is sequentially supplied to the detection electrodes Rx and the detection electrodes Tx, and the position and coordinates of a user's finger as an external approaching object are detected. FIG. 9 illustrates the detection electrode Rx2 and the detection electrode Tx2 as an example and indicates a state in which a user's finger O1 approaches or is in contact with the intersection of the detection electrode Rx2 and the detection electrode Tx2. Due to the user's finger O1, the capacitance of the detection electrode Rx2 is a value obtained by summing a self-capacity of the detection electrode Rx2 and a capacity Cx1 caused by the user's finger O1. Similarly, the capacitance of the detection electrode Tx2 is a value obtained by summing a self-capacity of the driving electrode Tx2 and a capacity Cx2 caused by the user's finger O1. In this state, for example, first, the detection electrode Rx2 is driven by a self-detection driving pulse Sig1 (alternating-current signal) via predetermined impedance R1, and the increased capacitance of the detection electrode Rx2 is charged by the self-detection driving pulse Sig1. A detecting circuit DET1 detects, based on the value of a charging voltage changed by the capacitor Cx1, that the user's finger O1 exists at the first detection electrode Rx2. Next, the detection electrode Tx2 is driven by a self-detection driving pulse Sig2 via predetermined impedance R2, and the increased capacitance of the detection electrode Tx2 is charged by the self-detection driving pulse Sig2. A detecting circuit DET2 detects, based on the value of a charging voltage changed by the capacitor Cx2, that the user's finger O1 exists at the driving electrode Tx2. Therefore, it is detected that the user's finger O1 exists at the intersection of the detection electrode Rx2 and the detection electrode Tx2, and detects the position and coordinates of the user's finger O1 on the surface of the touch panel.

Although not illustrated in FIG. 9, the detection electrodes Tx and the detection electrodes Rx are used as the sensor, as described with reference to FIG. 8. The detection electrodes Tx that are sequentially driven (scanned) by the self-detection driving pulse Sig2 include plural stripe-shaped driving electrodes Tx (Tx1, Tx2, Tx3, ... ) as illustrated in FIG. 7. The detection electrodes Tx are arranged in the second direction Y or the first direction X. Similarly, the detection electrodes Rx that are sequentially driven (scanned) by the self-detection driving pulse Sig1 include the plural stripe-shaped detection electrodes Rx (Rx1, Rx2, Rx3, ... ). The detection electrodes Rx are arranged in the direction (first direction X or second direction Y) perpendicular to or intersecting the driving electrodes Tx. By using the configuration illustrated in FIG. 9 to sequentially drive (scan) the first detection electrodes Rx and the detection electrodes Tx based on the self-detection method, the position of the external approaching object O1 at an intersection of a detection electrode Rx and a detection electrode Tx can be detected. In a detection period for the detection using the self-detection method, each of the detection electrodes Rx and the detection electrodes Tx can be treated as a detection electrode. The shapes of the detection electrodes Tx and the shapes of the detection electrodes Rx may be the same as the shapes of the driving electrodes Tx illustrated in FIGS. 5 and 6 and the shapes of the detection electrodes Rx illustrated in FIGS. 5 and 7.

In the self-detection method, the touch sensor may drive only detection electrodes DETE using the self-detection driving pulse Sig1, detect whether an external approaching object such as a finger exists in a low power consumption mode, switch the self-detection to the mutual detection, and detect coordinates of the external approaching object. In addition, the detection electrodes Rx may not be mounted, the detection electrodes Tx may be arranged in a matrix form in a row direction (first direction X) and a column direction (second direction Y), and coordinates of an external approaching object such as a finger may be detected by only the detection electrodes Tx in the self-detection method.

Although not illustrated in FIGS. 8 and 9, a configuration in which the mutual detection method and the self-detection method can be switched by a switch or the like may be used. In addition, the configuration for the self-detection method that is illustrated in FIG. 9 is an example and is not limited to this.

Second Touch Detection

Next, the second touch detection by the touch panel TP used for the display device DSP with the sensor is described. As a method of performing the second touch detection to detect that the external approaching object O1 such as the user's finger or the pen approaches the touch sensor area TPA of the touch panel TP, the self-detection method is used. Since the second touch detection is used to detect that the finger approaches to the touch sensor area TPA, the second touch detection can be referred to as finger detection.

Figure 10:
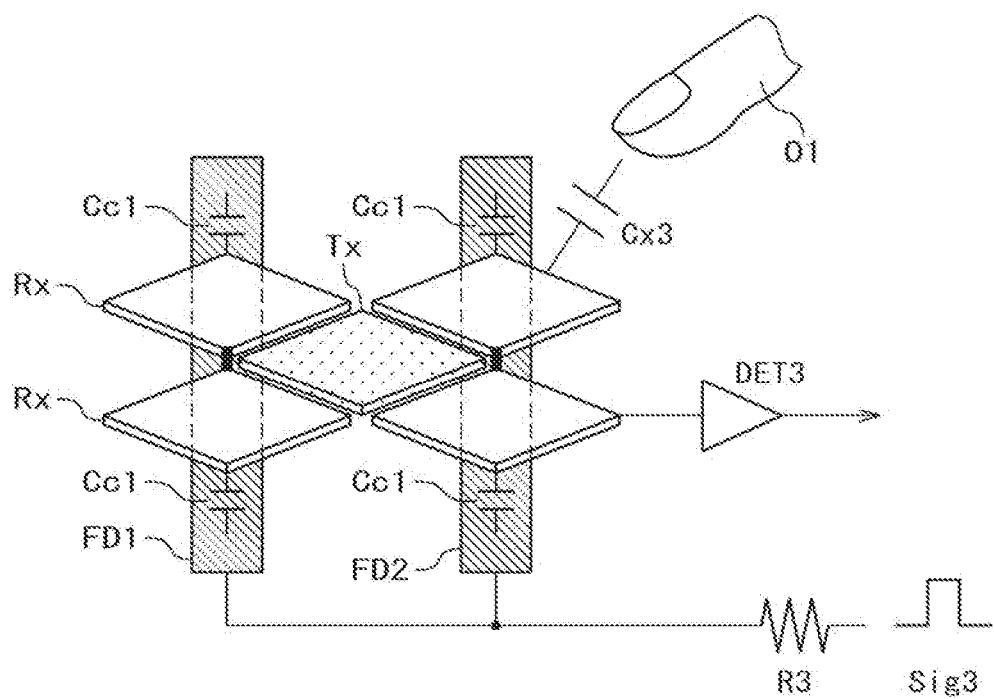
FIG. 10 is a diagram describing second touch detection.

FIG. 10 is a diagram describing the second touch detection. In the second touch detection, plural second detection electrodes FD (FD1 and FD2) are used. In this example, the second detection electrodes FD (FD1 and FD2) are arranged on the lower side of the detection electrodes Rx. Specifically, the second detection electrodes FD (FD1 and FD2) overlap the detection electrodes Rx in a plan view. Coupling capacitors Cc1 exist between the second detection electrodes FD (FD1 and FD2) and the detection electrodes Rx. Due to the user's finger O1, the capacitance of the detection electrodes Rx is a value obtained by summing self-capacities of the detection electrodes Rx and a capacity Cx3 caused by the user's finger O1. For example, in a detection period for the second touch detection, when the second detection electrodes FD (FD1 and FD2) are driven by a detection driving pulse Sig3 (alternating-current signal) via predetermined impedance R3, the detection electrodes Rx are also driven by the self-detection driving pulse Sig3 (alternating-current signal) due to the coupling capacitors Cc1. The increased capacitance Cx3 of the detection electrodes Rx is charged by the detection driving pulse Sig3. A detecting circuit DET3 connected to the detection electrodes Rx can detect, based on the value of a charging voltage changed by the capacitance Cx3, that the user's finger O1 exists near the detection electrodes Rx.

Although FIG. 10 illustrates the case where the second detection electrodes FD (FD1 and FD2) are arranged on the lower side of the detection electrodes Rx, the arrangement is not limited to this. The second detection electrodes FD (FD1 and FD2) may be arranged on the lower side of the driving electrodes Tx. In this case, the detection electrodes Rx are driven due to the coupling between the second detection electrodes FD (FD1 and FD2) and the driving electrodes Tx and the coupling between the driving electrodes Tx and the detection electrodes Rx, and it is detected that the external approaching object approaches, based on fluctuation of the detection electrodes Rx. Alternatively, the driving electrodes Tx may be connected to a detecting circuit by a switch or the like and the detecting circuit may detect that the external approaching object approaches, based on fluctuation of the driving electrodes Tx.

Figure 11:
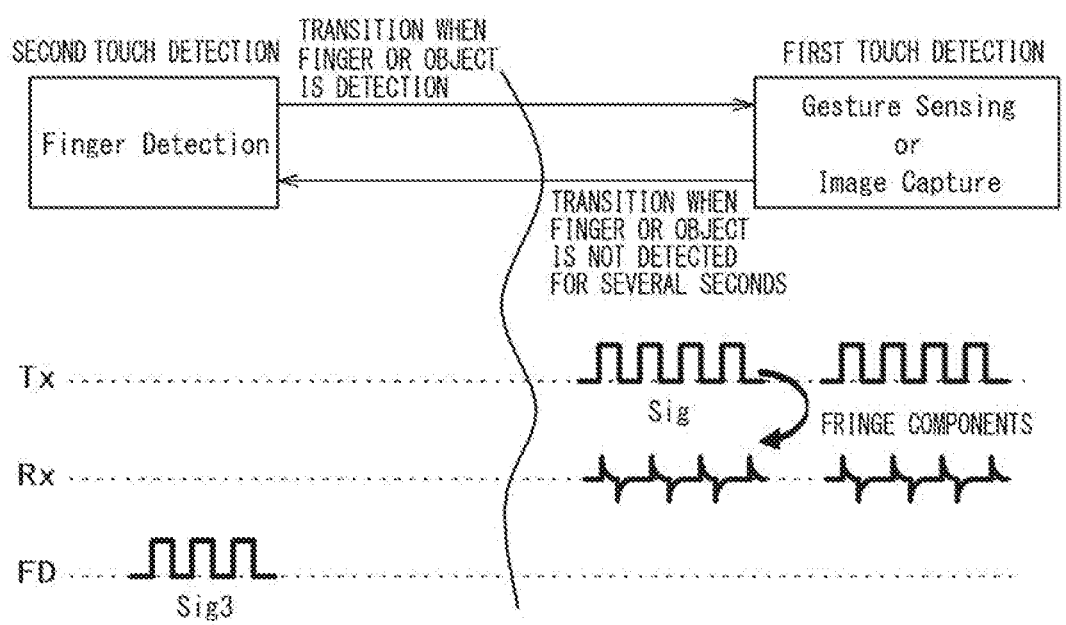
FIG. 11 is a diagram describing detection periods for first and second touch detection according to the embodiment.
Figure 12:
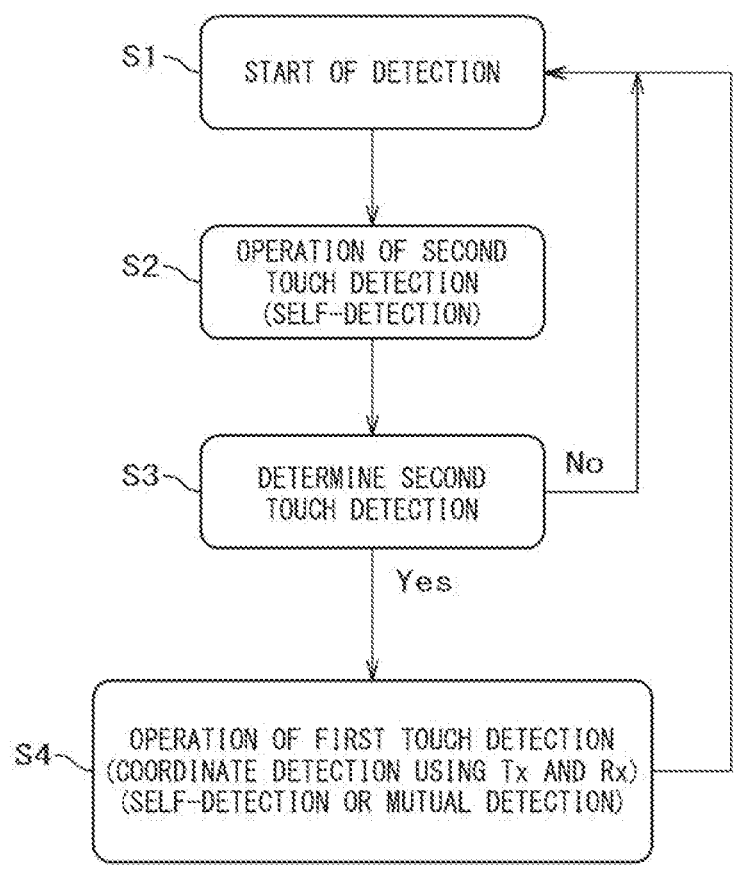
FIG. 12 is a diagram describing a flow of touch detection by the display device according to the embodiment.

FIG. 11 is a diagram describing detection periods for the first and second touch detection according to the embodiment. FIG. 12 is a diagram describing a flow of touch detection by the display device according to the embodiment. Although the first touch detection is used to detect the position and coordinates of an external approaching object such as a finger or a pen, the first touch detection can be used for fingerprint authentication in which an image of a finger is acquired. The detection of the position and coordinates of the external approaching object can be referred to as gesture sensing. In addition, the fingerprint authentication in which an image of a finger is acquired can be referred to as image capture. Since the second touch detection is used to detect that a finger approaches in many cases, the second touch detection can be referred to as finger detection.

The touch panel TP illustrated in FIG. 5 performs an operation of the second touch detection to detect whether an external approaching object such as a finger or a pen approaches the touch sensor area TPA for low power consumption. In the detection period for the second touch detection, the second detection electrodes FD are driven by the self-detection driving pulse Sig3 based on the self-detection method.

When the external approaching object is detected by the second touch detection (for example, finger detection), the touch panel TP transitions from the operation of the second touch detection to an operation of the first touch detection.

In the detection period for the first touch detection, the driving electrodes Tx are sequentially driven by the driving pulse (Sig) based on, for example, the mutual detection method, and a pulse-like waveform based on fringe components is obtained for the detection electrodes Rx. Therefore, the position and coordinates of the external approaching object such as the finger or the pen on the touch sensor area TPA is detected or an image of the finger is acquired.

When the external approaching object such as the finger or the pen is not detected on the touch sensor area TPA for several seconds, it is determined that the external approaching object such as the finger or the pen is not detected, and the touch panel TP transitions from the operation of the first touch detection to the operation of the second touch detection. This reduces power to be consumed by the touch panel TP.

As illustrated in FIG. 12, when power is supplied to an electronic device that includes the display device DSP and is a mobile phone or the like, the touch detection is started (in step S1) and proceeds to step S2.

In step S2, the operation of the second touch detection is performed based on the self-detection method. Then, the touch detection proceeds to step S3.

In step S3, the second touch detection performed in step S2 is determined. When the external approaching object is detected by the second touch detection, the touch detection proceeds to step S4. When the external approaching object is not detected by the second touch detection, the touch detection proceeds to step S1 and proceeds to step S2.

In step S4, the operation of the first touch detection is performed based on the self-detection method or the mutual detection method. Therefore, the position and coordinates of the external approaching object such as the finger or the pen on the touch sensor area TPA is detected or an image of the finger is acquired. In step S4, when the external approaching object such as the finger or the pen is not detected on the touch sensor ara TPA for several seconds, the touch detection proceeds to step S1 and proceeds to step S2.

In the case where the second detection electrodes FD exist on the lower side of the driving electrodes Tx and the detection electrodes Rx, during the time when the operation of the second touch detection is performed based on the self-detection method, the driving electrodes Tx and the detection electrodes Rx are in a floating (high-impedance) state.

By using the foregoing detection flow, power to be consumed by the touch panel TP is reduced.

Next, modification examples of the planar layout of the touch panel TP are described with reference to the drawings.

MODIFICATION EXAMPLES OF PLANAR LAYOUT OF TOUCH PANEL TP

First Modification Example

Figure 13:
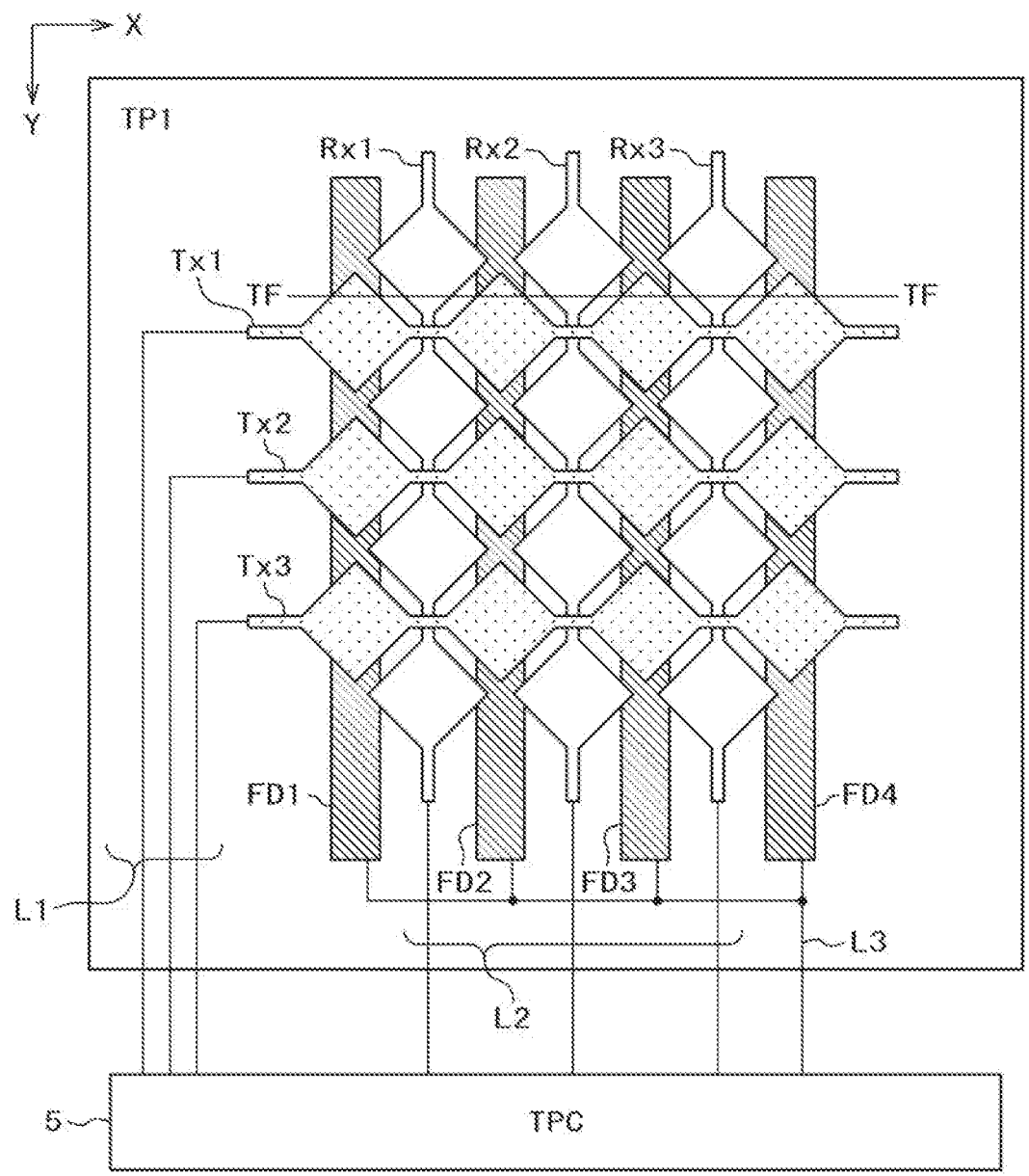
FIG. 13 is a diagram illustrating a planar layout of a touch panel according to a first modification example.

FIG. 13 is a diagram illustrating a configuration example of a planar layout of a touch panel TP1 according to a first modification example. The touch panel TP1 illustrated in FIG. 13 is different from the touch panel TP illustrated in FIG. 5 in that plural second detection electrodes FD (FD1, FD2, FD3, and FD4) are arranged on the lower side of plural driving electrodes Tx (Tx1, Tx2, and Tx3) in FIG. 13. Specifically, the second detection electrode FD1 is arranged on the lower side of the pads PD1 of the driving electrodes Tx (Tx1, Tx2, and Tx3) and overlaps the pads PD1 of the driving electrodes Tx (Tx1, Tx2, and Tx3) in a plan view. Similarly, the second detection electrode FD2 is arranged on the lower side of the pads PD2 of the driving electrodes Tx (Tx1, Tx2, and Tx3) and overlaps the pads PD2 of the driving electrodes Tx (Tx1, Tx2, and Tx3) in the plan view. The second detection electrode FD3 is arranged on the lower side of the pads PD3 of the driving electrodes Tx (Tx1, Tx2, and Tx3) and overlaps the pads PD3 of the driving electrodes Tx (Tx1, Tx2, and Tx3) in the plan view. The second detection electrode FD4 is arranged on the lower side of the pads PD4 of the driving electrodes Tx (Tx1, Tx2, and Tx3) and overlaps the pads PD4 of the driving electrodes Tx (Tx1, Tx2, and Tx3) in the plan view. Other configurations illustrated in FIG. 13 are the same as the configurations illustrated in FIG. 5.

Therefore, as illustrated in FIG. 13, the second detection electrodes FD overlap the first detection electrode TR comprising the driving electrodes Tx and the detection electrodes Rx in the plan view. In addition, the areas of overlapping portions of the second detection electrodes FD and the driving electrodes Tx are larger than the areas of overlapping portions of the second detection electrodes FD and the detection electrodes Rx.

Second Modification Example

Figure 14:
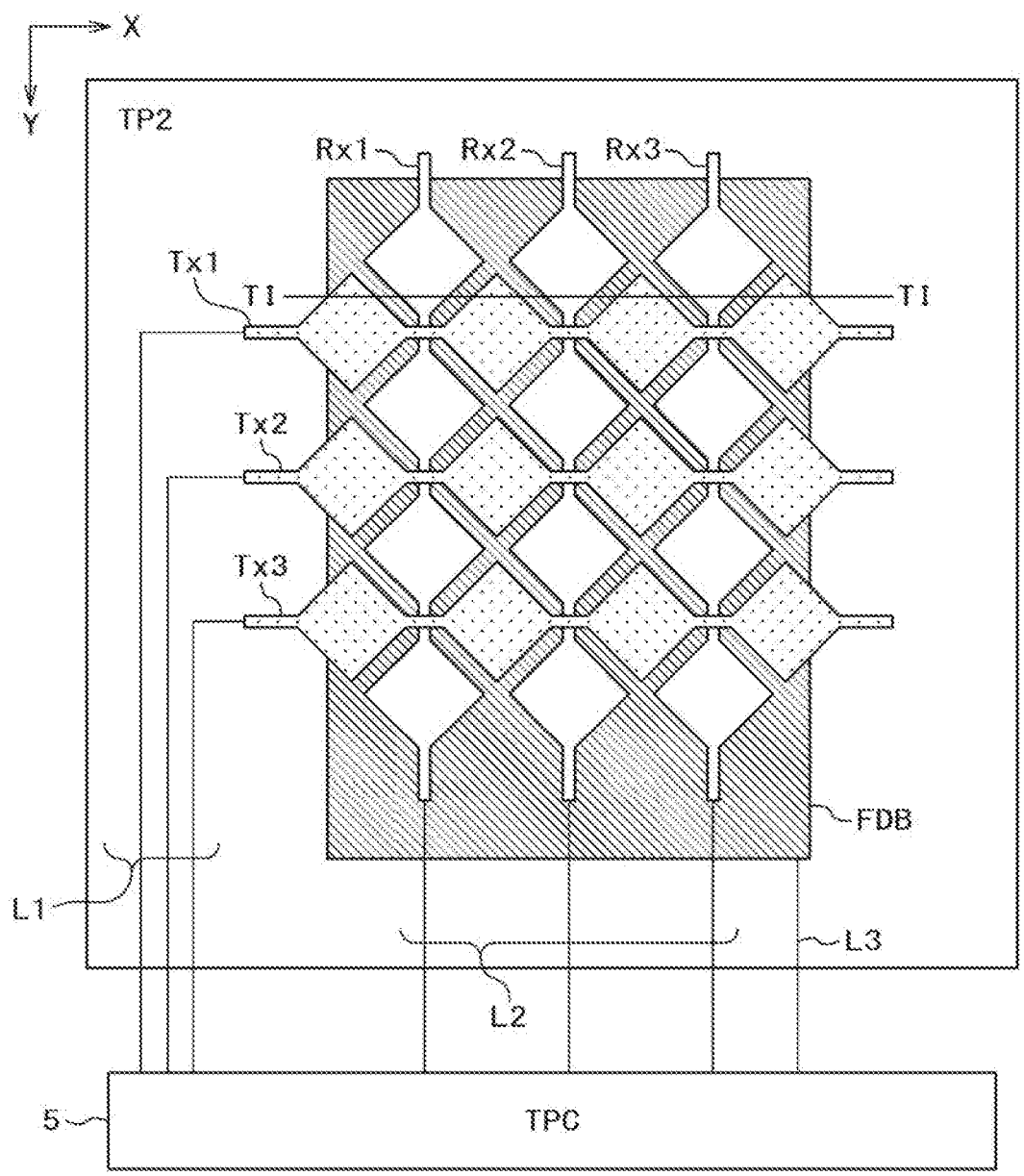
FIG. 14 is a diagram illustrating a planar layout of a touch panel according to a second modification example.

FIG. 14 is a diagram illustrating a configuration example of a planar layout of a touch panel TP2 according to a second modification example. The touch panel TP2 illustrated in FIG. 14 is different from the touch panel TP illustrated in FIG. 5 in that a single second detection electrode FDB is arranged on the lower side of the driving electrodes Tx (Tx1, Tx2, and Tx3) and the detection electrodes Rx (Rx1, Rx2, and Rx3) in FIG. 14. Other configurations illustrated in FIG. 14 are the same as the configurations illustrated in FIG. 5.

Therefore, as illustrated in FIG. 14, the single second detection electrode FD overlaps the first detection electrode TR comprising the driving electrodes Tx and the detection electrodes Rx.

Shape Examples of Pads of Driving Electrodes Tx and Pads of Detection Electrodes Rx Shape Examples of Pad of Drive Electrode Tx and Pad of Detection Electrode Rx Next, modification examples of the shapes of the driving electrodes Tx and the shapes of the detection electrodes Rx are described. In the configurations illustrated in FIGS. 5, 13, and 14, the pads PD1 to PD4 comprised in the driving electrodes Tx are separated from the pads PD11 to PD14 comprised in the detection electrodes Rx in the plan view, but the arrangement is not limited to this. The pads PD1 to PD4 comprised in the driving electrodes Tx may overlap the pads PD11 to PD14 comprised in the detection electrodes Rx in the plan view.

First Shape Example

Figure 15:
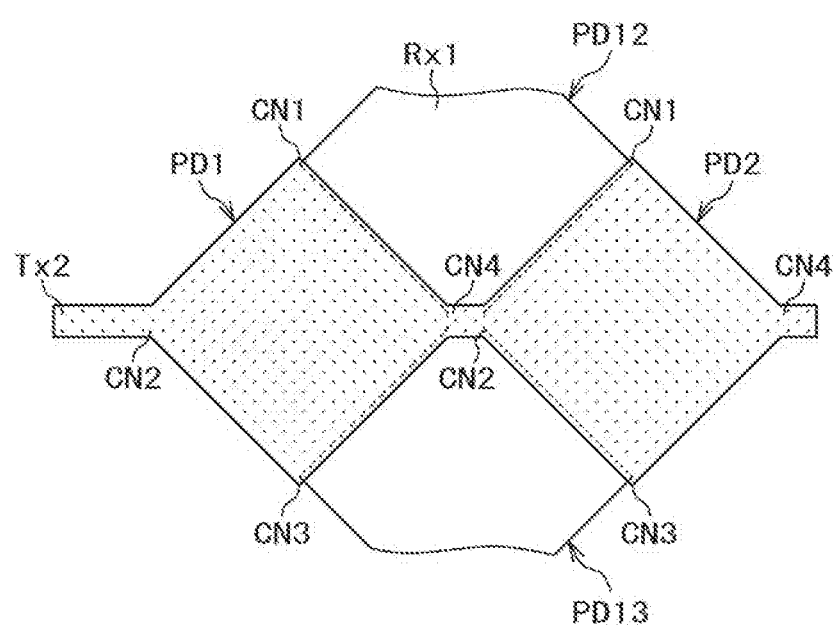
FIG. 15 is a plan view describing a first shape example.

FIG. 15 is a plan view describing a first shape example. FIG. 15 illustrates the pads PD1 and PD2 of the driving electrode Tx2 and the pads PD12 and PD13 of the detection electrode Rx1 and indicates an arrangement example in which the detection electrode Rx1 is arranged on the lower side of the driving electrode Tx2. The other pads PD1 to PD4 that are not illustrated in FIG. 15 and comprised in the driving electrodes Tx and the other pads PD11 to PD14 that are not illustrated in FIG. 15 and comprised in the detection electrodes Rx are configured in the same manner as the pads illustrated in FIG. 15.

As illustrated in FIG. 15, an end of the pad PD12 of the detection electrode Rx1 is arranged on the lower side of a side of the pad PD1 of the driving electrode Tx2 between the first corner CN1 of the pad PD1 and the fourth corner CN4 of the pad PD1 and partially overlaps the side of the pad PD1 in a plan view. In addition, an end of the pad PD13 of the detection electrode Rx1 is arranged on the lower side of a side of the pad PD1 of the driving electrode Tx2 between the third corner CN3 of the pad PD1 and the fourth corner CN4 of the pad PD1 and partially overlaps the side of the pad PD1 in the plan view. In addition, an end of the pad PD12 of the detection electrode Rx1 is arranged on the lower side of a side of the pad PD2 of the driving electrode Tx2 between the first corner CN1 of the pad PD2 and the second corner CN2 of the pad PD2 and partially overlaps the side of the pad PD2 in the plan view. In addition, an end of the pad PD13 of the detection electrode Rx1 is arranged on the lower side of a side of the pad PD2 of the driving electrode Tx2 between the third corner CN3 of the pad PD2 and the second corner CN2 of the pad PD2 and partially overlaps the side of the pad PD2 in the plan view.

Second Shape Example

Figure 16:
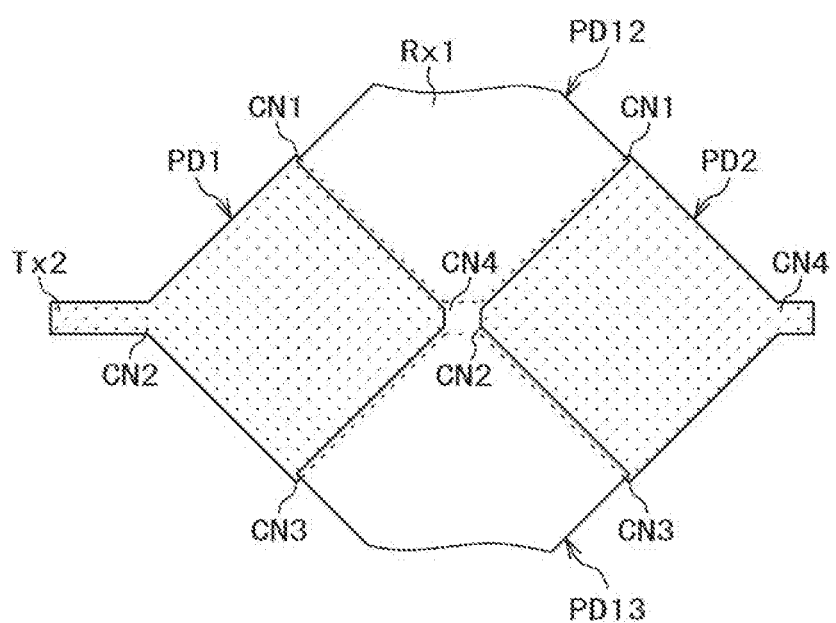
FIG. 16 is a plan view describing a second shape example.

FIG. 16 is a plan view describing a second shape example. FIG. 16 illustrates the pads PD1 and PD2 of the driving electrode Tx2 and the pads PD12 and PD13 of the detection electrode Rx1 and indicates an arrangement example in which the detection electrode Rx1 is arranged on the upper side of the driving electrode Tx2. The other pads PD1 to PD4 that are not illustrated in FIG. 16 and comprised in the driving electrodes Tx and the other pads PD11 to PD14 that are not illustrated in FIG. 16 and comprised in the detection electrodes Rx are configured in the same manner as the pads illustrated in FIG. 16.

As illustrated in FIG. 16, the pad PD12 of the detection electrode Rx1 is arranged on the upper side of a side of the pad PD1 of the driving electrode Tx2 between the first corner CN1 of the pad PD1 and the fourth corner CN4 of the pad PD1 and partially overlaps the side of the pad PD1 in a plan view. In addition, an end of the pad PD13 of the detection electrode Rx1 is arranged on the upper side of a side of the pad PD1 of the driving electrode Tx2 between the third corner CN3 of the pad PD1 and the fourth corner CN4 of the pad PD1 and partially overlaps the side of the pad PD1 in the plan view. In addition, an end of the pad PD12 of the detection electrode Rx1 is arranged on the upper side of a side of the pad PD2 of the driving electrode Tx2 between the first corner CN1 of the pad PD2 and the second corner CN2 of the pad PD2 and partially overlaps the side of the pad PD2 in the plan view. In addition, an end of the pad PD13 of the detection electrode Rx1 is arranged on the upper side of a side of the PD2 of the driving electrode Tx2 between the third corner CN3 of the pad PD2 and the second corner CN2 of the pad PD2 and partially overlaps the side of the pad PD2 in the plan view.

Next, some configuration examples of the planer layout of the touch panel TP having the configuration illustrated in FIG. 15 or 16 are described.

Third Modification Example

Figure 17:
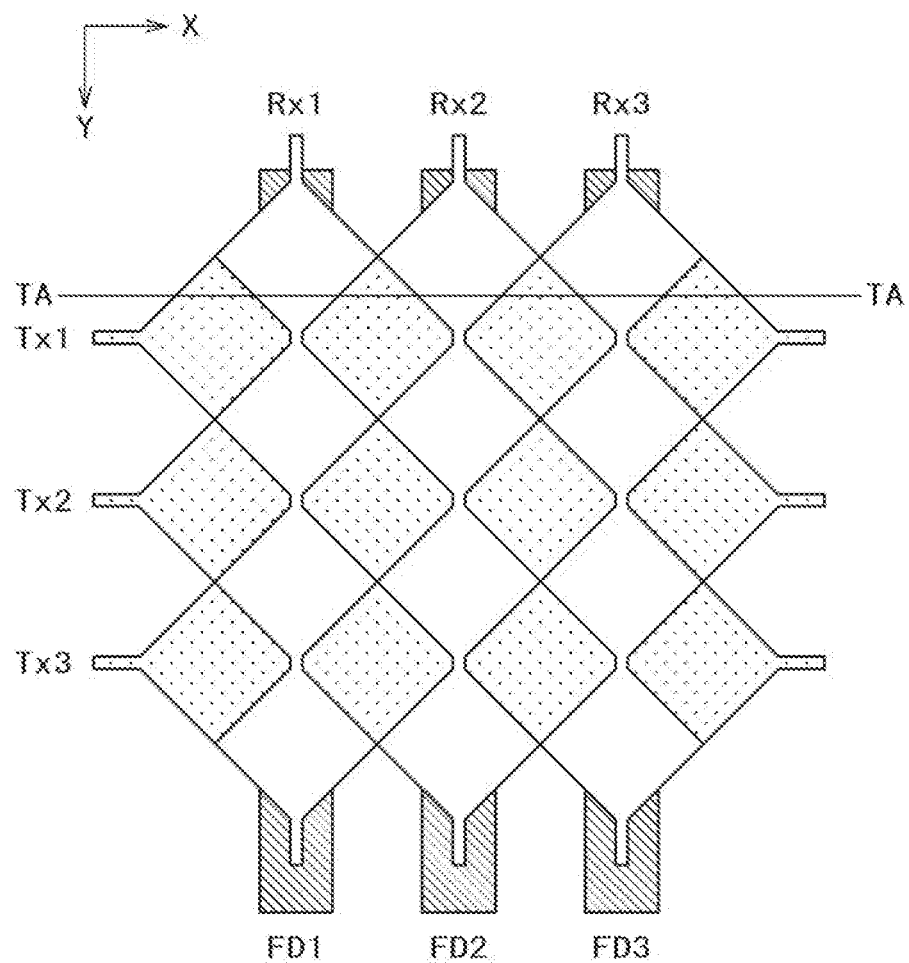
FIG. 17 is a diagram illustrating a configuration example of a planar layout of a touch panel according to a third modification example.

FIG. 17 is a diagram illustrating a configuration example of a planer layout of a touch panel TP3 according to a third modification example. In this example, the second shape example illustrated in FIG. 16 is applied. The driving electrodes Tx (Tx1, Tx2, and Tx3) are arranged on the lower side of the detection electrodes Rx (Rx1, Rx2, and Rx3). The second detection electrodes FD (FD1, FD2, and FD3) are arranged on the lower side of the detection electrodes Rx (Rx1, Rx2, and Rx3).

Fourth Modification Example

Figure 18:
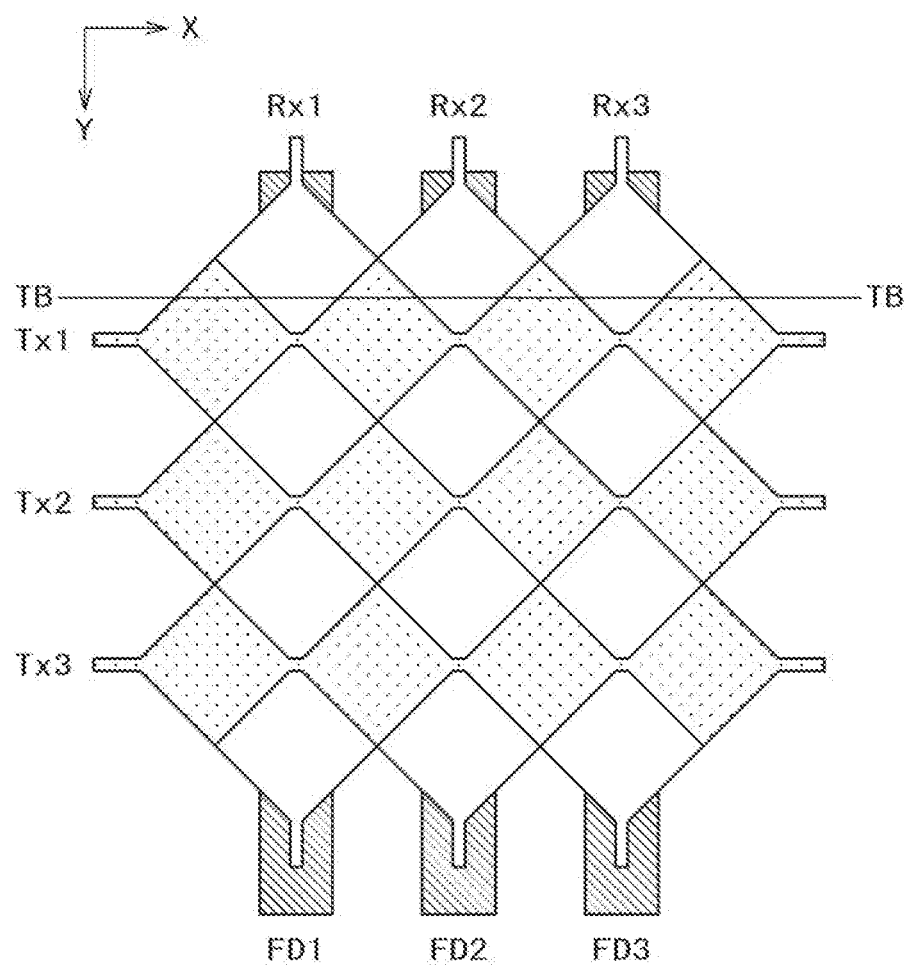
FIG. 18 is a diagram illustrating a configuration example of a planar layout of a touch panel according to a fourth modification example.

FIG. 18 is a diagram illustrating a configuration example of a planar layout of a touch panel TP4 according to a fourth modification example. In this example, the first shape example illustrated in FIG. 15 is applied. The driving electrodes Tx (Tx1, Tx2, and Tx3) are arranged on the upper side of the detection electrodes Rx (Rx1, Rx2, and Rx3). The second detection electrodes FD (FD1, FD2, and FD3) are arranged on the lower side of the detection electrodes Rx (Rx1, Rx2, and Rx3).

Fifth Modification Example

Figure 19:
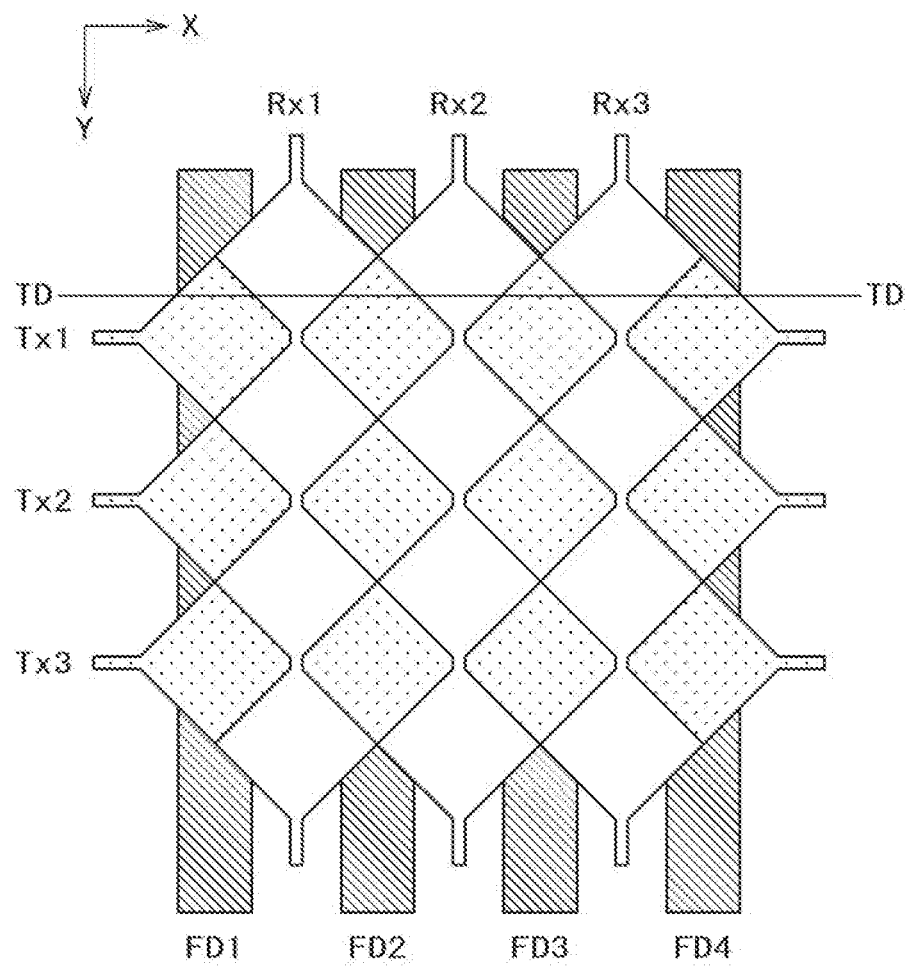
FIG. 19 is a diagram illustrating a configuration example of a planar layout of a touch panel according to a fifth modification example.

FIG. 19 is a diagram illustrating a configuration example of a planar layout of a touch panel TP5 according to a fifth modification example. In this example, the second shape example illustrated in FIG. 16 is applied. The driving electrodes Tx (Tx1, Tx2, and Tx3) are arranged on the lower side of the detection electrodes Rx (Rx 1, Rx2, and Rx3). The second detection electrodes FD (FD1, FD2, FD3, and FD4) are arranged on the lower side of the driving electrodes Tx (Tx1, Tx2, and Tx3).

Sixth Modification Example

Figure 20:
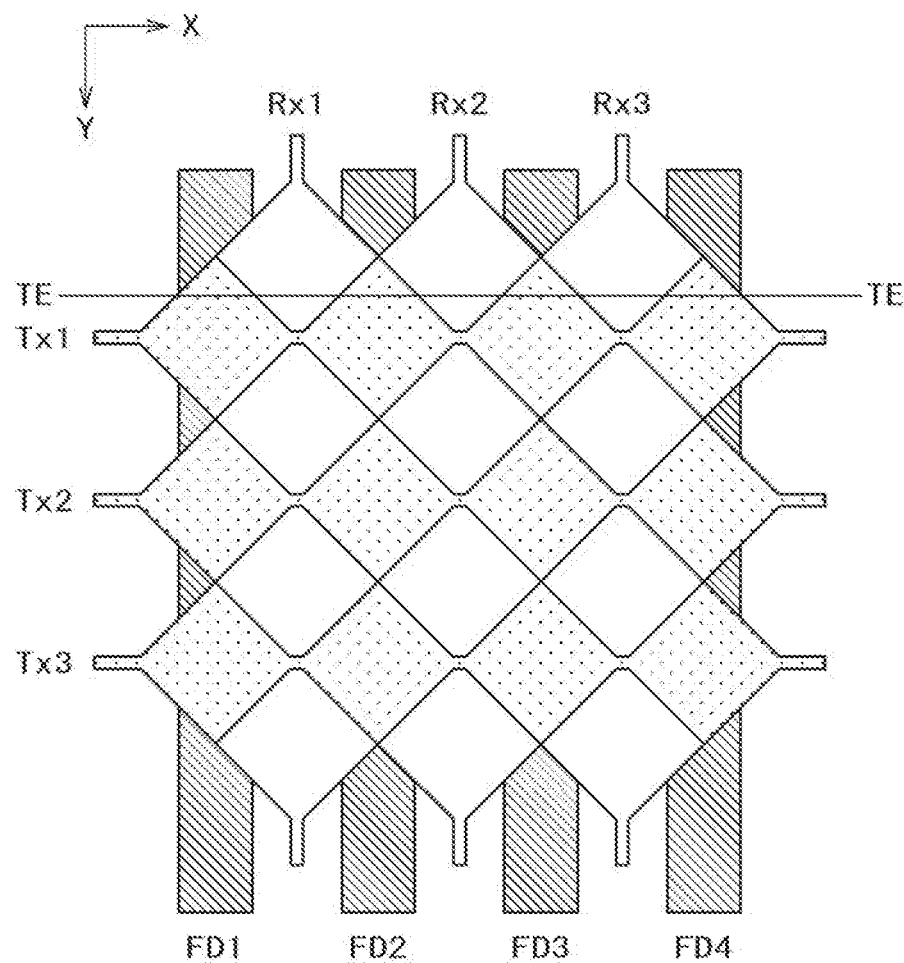
FIG. 20 is a diagram illustrating a configuration example of a planar layout of a touch panel according to a sixth modification example.

FIG. 20 is a diagram illustrating a configuration example of a planar layout of a touch panel TP6 according to a sixth modification example. In this example, the first shape example illustrated in FIG. 15 is applied. The driving electrodes Tx (Tx1, Tx2, and Tx3) are arranged on the upper side of the detection electrodes Rx (Rx1, Rx2, and Rx3). The second detection electrodes FD (FD1, FD2, FD3, and FD4) are arranged on the lower side of the driving electrodes Tx (Tx1, Tx2, and Tx3).

Seventh Modification Example

Figure 21:
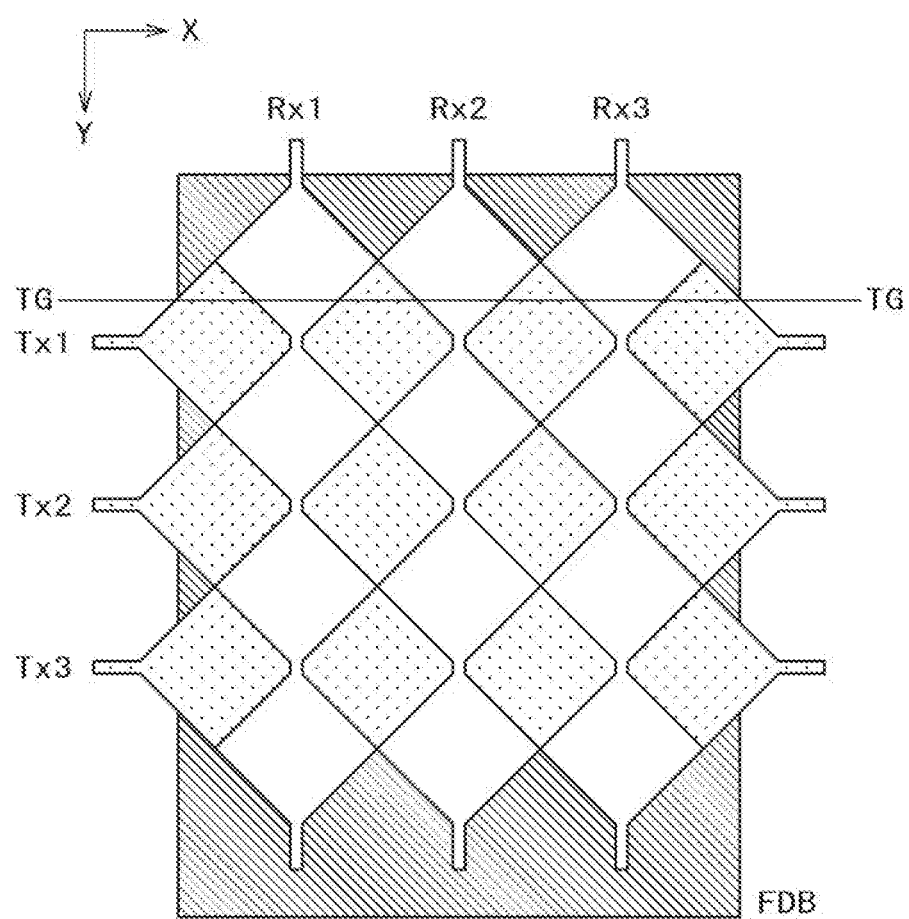
FIG. 21 is a diagram illustrating a configuration example of a planar layout of a touch panel according to a seventh modification example.

FIG. 21 is a diagram illustrating a configuration example of a planar layout of a touch panel TP7 according to a seventh modification example. In this example, the second shape example illustrated in FIG. 16 is applied. The driving electrodes Tx (Tx1, Tx2, and Tx3) are arranged on the lower side of the detection electrodes Rx (Rx1, Rx2, and Rx3). The single second detection electrode FDB is arranged on the lower side of the detection electrodes Rx (Rx1, Rx2, and Rx3) and the driving electrodes Tx (Tx1, Tx2, and Tx3).

Eighth Modification Example

Figure 22:
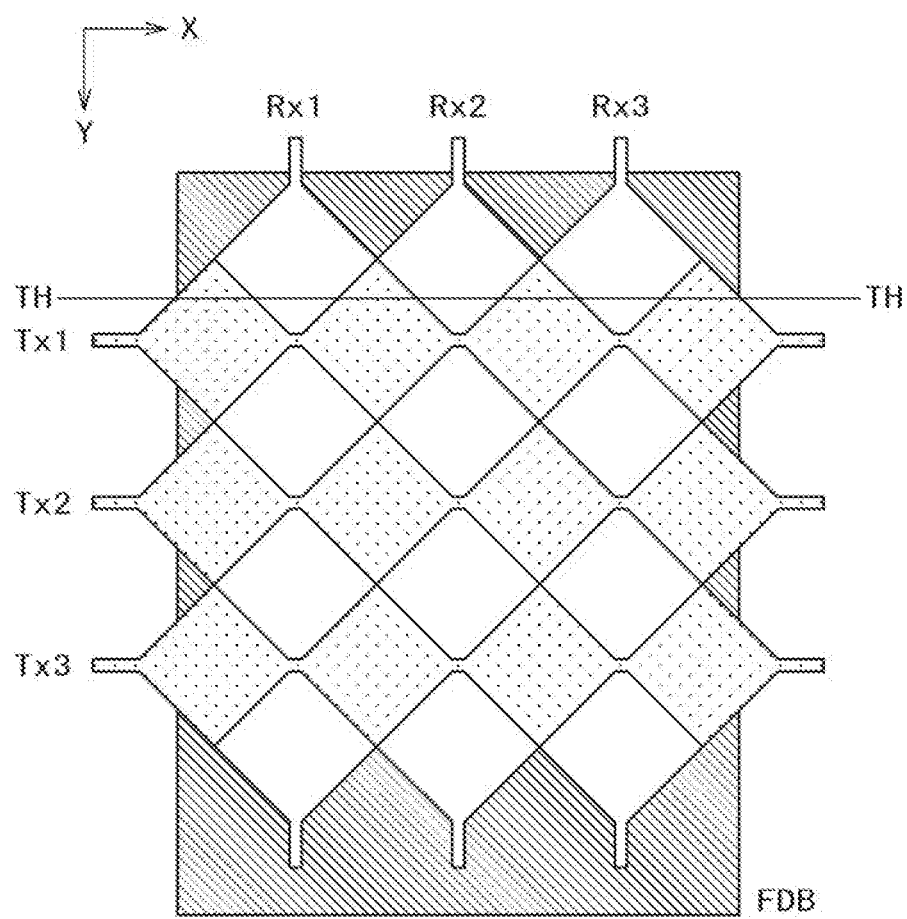
FIG. 22 is a diagram illustrating a configuration example of a planar layout of a touch panel according to an eighth modification example.

FIG. 22 is a diagram illustrating a configuration example of a planar layout of a touch panel TP8 according to an eighth modification example. In this example, the first shape example illustrated in FIG. 15 is applied. The driving electrodes Tx (Tx1, Tx2, and Tx3) are arranged on the upper side of the detection electrodes Rx (Rx1, Rx2, and Rx3). The single second detection electrode FDB is arranged on the lower side of the detection electrodes Rx (Rx1, Rx2, and Rx3) and the driving electrodes Tx (Tx1, Tx2, and Tx3).

The configurations described in the embodiment (FIG. 5) and the first to eighth modification examples are summarized as follows.

1) The plurality of driving electrodes Tx (Tx1, Tx2, and Tx3) extend in the first direction X and are arranged in the second direction Y intersecting the first direction X. The plurality of detection electrodes Rx (Rx1, Rx2, and Rx3) extend in the second direction Y and are arranged in the first direction X intersecting the second direction Y.

2) The plurality of second detection electrodes FD overlap the first detection electrode TR comprising the plural driving electrodes Tx and the plural detection electrodes Rx in the plan view.

3) Each of the plural driving electrodes Tx and the plural detection electrodes Rx has the structure in which the corners of the squares (pads PD1 to PD4 or pads PD11 to PD14) constituting the plural pads are joined to each other in the plan view.

The configurations described in the embodiment (FIG. 5) and the third and fourth modification examples are summarized as follows.

1) The plurality of second detection electrodes FD (FD1, FD2, and FD3) have the stripe-shaped electrode structure.

2) The plurality of second detection electrodes FD (FD1, FD2, and FD3) are arranged on the lower side of the plural detection electrodes Rx (Rx1, Rx2, and Rx3) and overlap the plural detection electrodes Rx (Rx1, Rx2, and Rx3) in the plan view.

3) The areas of the portions included in the plural second detection electrodes FD and overlapping the plural detection electrodes Rx are larger than the areas of the portions included in the plural second detection electrodes FD and overlapping the plural driving electrodes Tx.

4) Each of the plural driving electrodes Tx and the plural detection electrodes Rx has the structure in which the corners of the squares constituting the plural pads are joined to each other in the plan view.

5) The stripe-shaped electrodes comprised in the plural second detection electrodes FD (FD1, FD2, and FD3) overlap the corners of the squares constituting the pads of the driving electrodes Tx and the corners of the squares constituting the pads of the detection electrodes Rx in the plan view.

The configurations described in the first, fifth, and sixth modification examples are summarized as follows.

1) The plurality of second detection electrodes FD (FD1, FD2, FD3, and FD4) have the stripe-shaped electrode structure.

2) The plurality of second detection electrodes FD (FD1, FD2, FD3, and FD4) are arranged on the lower side of the plural driving electrodes Tx (Tx1, Tx2, and Tx3) and overlap the plural driving electrodes Tx (Tx1, Tx2, and Tx3) in the plan view.

3) The areas of the portions included in the plural second detection electrodes FD and overlapping the plural driving electrodes Tx are larger than the areas of the portions included in the plural second detection electrodes FD and overlapping the plural detection electrodes Rx.

4) Each of the plural driving electrodes Tx and the plural detection electrodes Rx has the structure in which the corners of the squares constituting the plural pads are joined to each other in the plan view.

5) The stripe-shaped electrodes constituting the plural second detection electrodes FD (FD1, FD2, and FD3) overlap the corners of the squares constituting the pads of the driving electrodes Tx and the corners of the squares constituting the pads of the detection electrodes Rx in the plan view.

The configurations described in the second, seventh, and eighth modification examples are summarized as follows.

1) The second detection electrode FDB overlaps the first detection electrode TR comprising the plural driving electrodes Tx and the plural detection electrodes Rx in the plan view.

Figure 23:
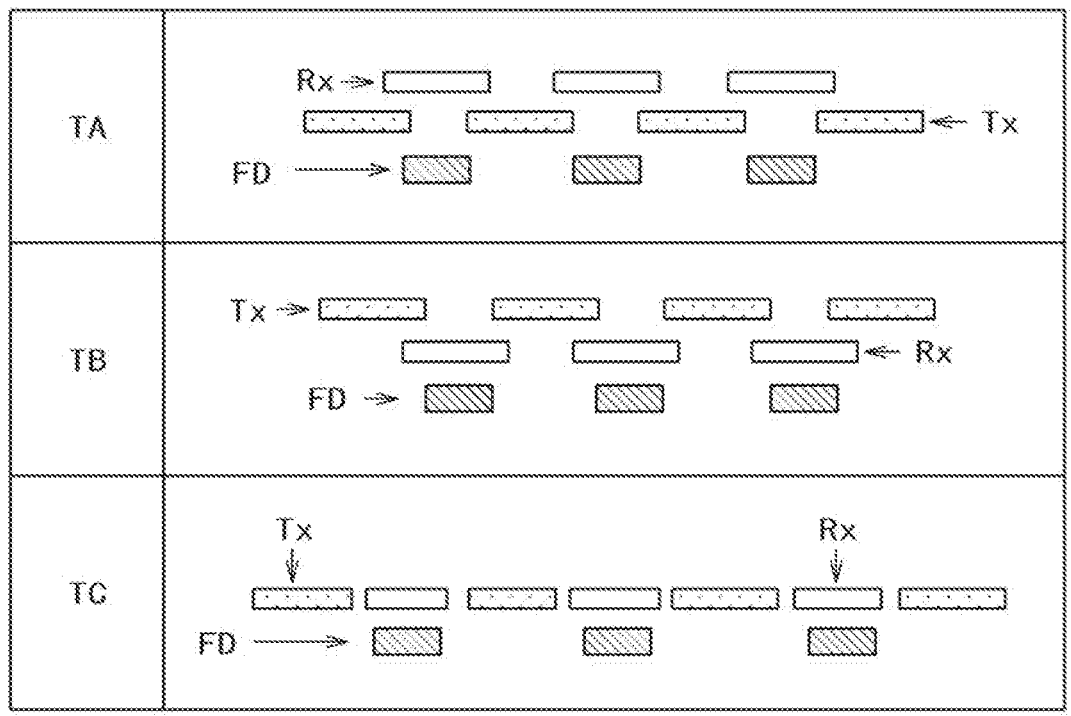
FIG. 23 is a diagram collectively illustrating cross-sectional views in the case where plural second detection electrodes are arranged on the lower side of plural detection electrodes.

FIG. 23 is a diagram collectively illustrating cross-sectional views in the case where the plural second detection electrodes FD (FD1, FD2, and FD3) are arranged on the lower side of the plural detection electrodes Rx (Rx1, Rx2, and Rx3).

A type TA indicates a cross-sectional view taken along a TA-TA line in the third modification example illustrated in FIG. 17.

A type TB indicates a cross-sectional view taken along a TB-TB line in the fourth modification example illustrated in FIG. 18.

A type TC indicates a cross-sectional view taken along a TC-TC line in the embodiment illustrated in FIG. 5.

Figure 24:
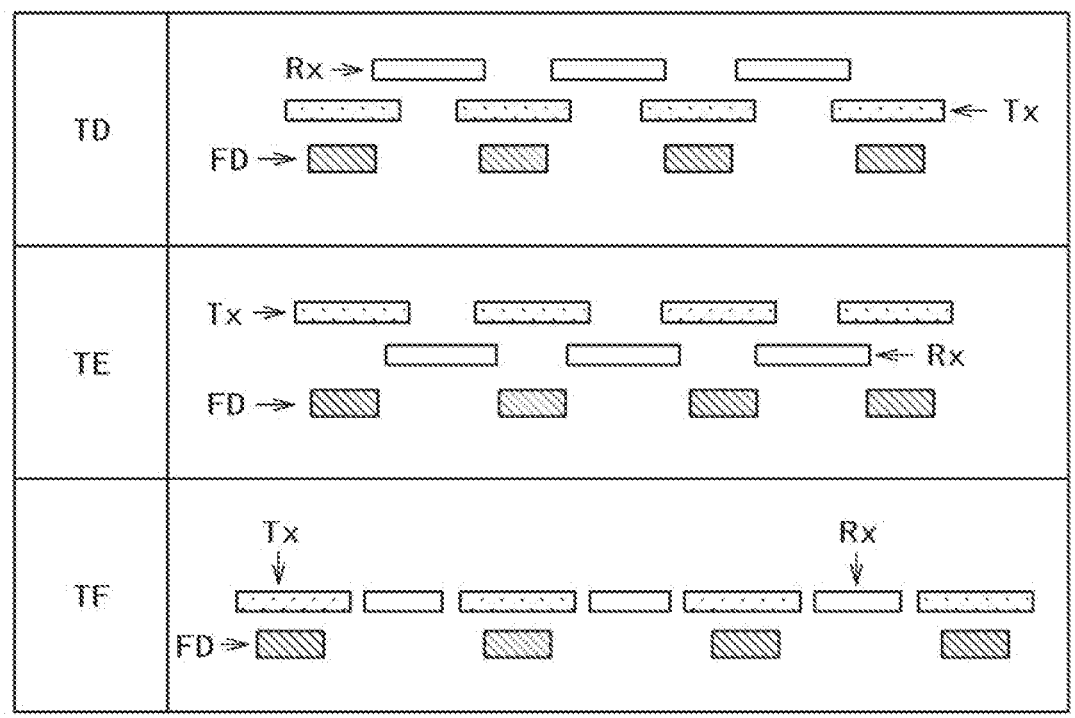
FIG. 24 is a diagram collectively illustrating cross-sectional views in the case where the plural second detection electrodes are arranged on the lower side of plural driving electrodes.

FIG. 24 is a diagram collectively illustrating cross-sectional views in the case where the plural second detection electrodes FD (FD1, FD2, FD3, and FD4) are arranged on the lower side of the plural driving electrodes Tx (Tx1, Tx2, and Tx3).

A type TD indicates a cross-sectional view taken along a TD-TD line in the fifth modification example illustrated in FIG. 19.

A type TE indicates a cross-sectional view taken along a TE-TE line in the sixth modification example illustrated in FIG. 20.

A type TF indicates a cross-sectional view taken along a TF-TF line in the first modification example illustrated in FIG. 13.

Figure 25:
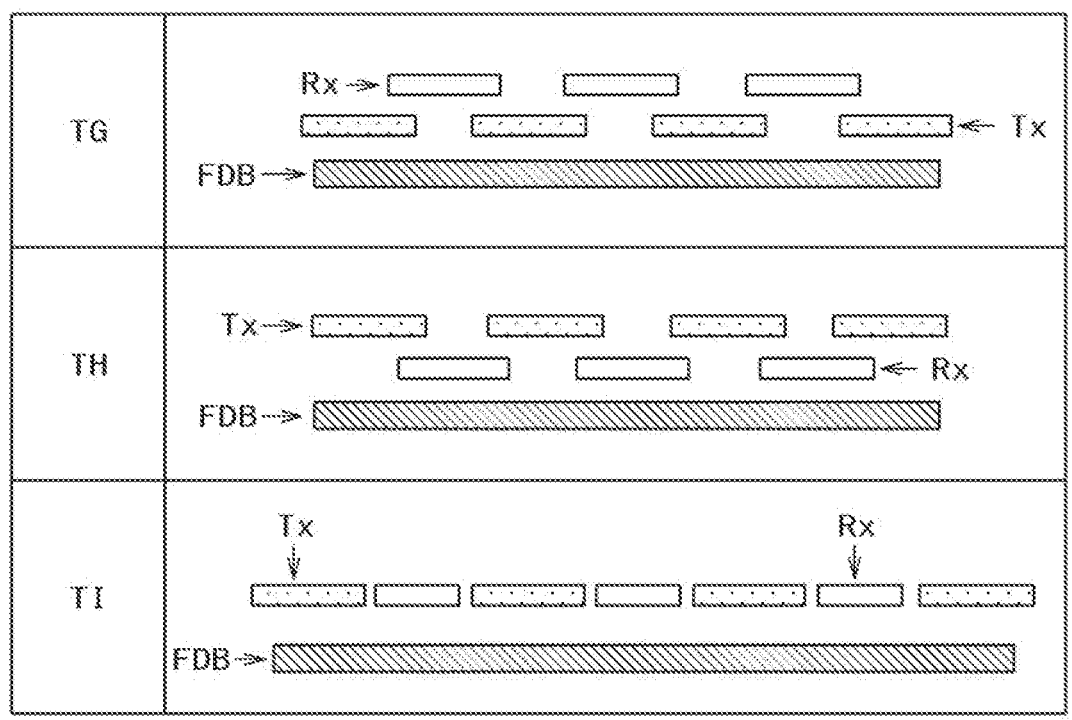
FIG. 25 is a diagram collectively illustrating cross-sectional views in the case where a second detection electrode is arranged on the lower side of the plural detection electrodes and the plural driving electrodes.

FIG. 25 is a diagram collectively illustrating cross-sectional views in the case where the second detection electrode FDB is arranged on the lower side of the plural detection electrodes Rx (Rx1, Rx2, and Rx3) and the plural driving electrodes Tx (Tx1, Tx2, and Tx3).

A type TG indicates a cross-sectional view taken along a TG-TG line in the seventh modification example illustrated in FIG. 21.

A type TH indicates a cross-sectional view taken along a TH-TH line in the eighth modification example illustrated in FIG. 22.

A type TI indicates a cross-sectional view taken along a TI-TI line in the second modification example illustrated in FIG. 14.

In the types TA, TD, and TG, the driving electrodes Tx, the detection electrodes Rx, and the second detection electrodes FD or the second detection electrode FDB are arranged in the order of the detection electrodes Rx, the driving electrodes Tx, and the second detection electrodes FD or the second detection electrode FDB from the upper side to the lower side in the cross-sectional view.

In the types TB, TE, and TH, the driving electrodes Tx, the detection electrodes Rx, and the second detection electrodes FD or the second detection electrode FDB are arranged in the order of the driving electrodes Tx, the detection electrodes Rx, and the second detection electrodes FD or the second detection electrode FDB from the upper side to the lower side in the cross-sectional view.

In the types TC, TF, and TI, the driving electrodes Tx and the detection electrodes Rx are formed in the same layer, and the second detection electrodes FD or the second detection electrode FDB are or is arranged on the lower side of the layer in the cross-sectional view.

Figure 26:
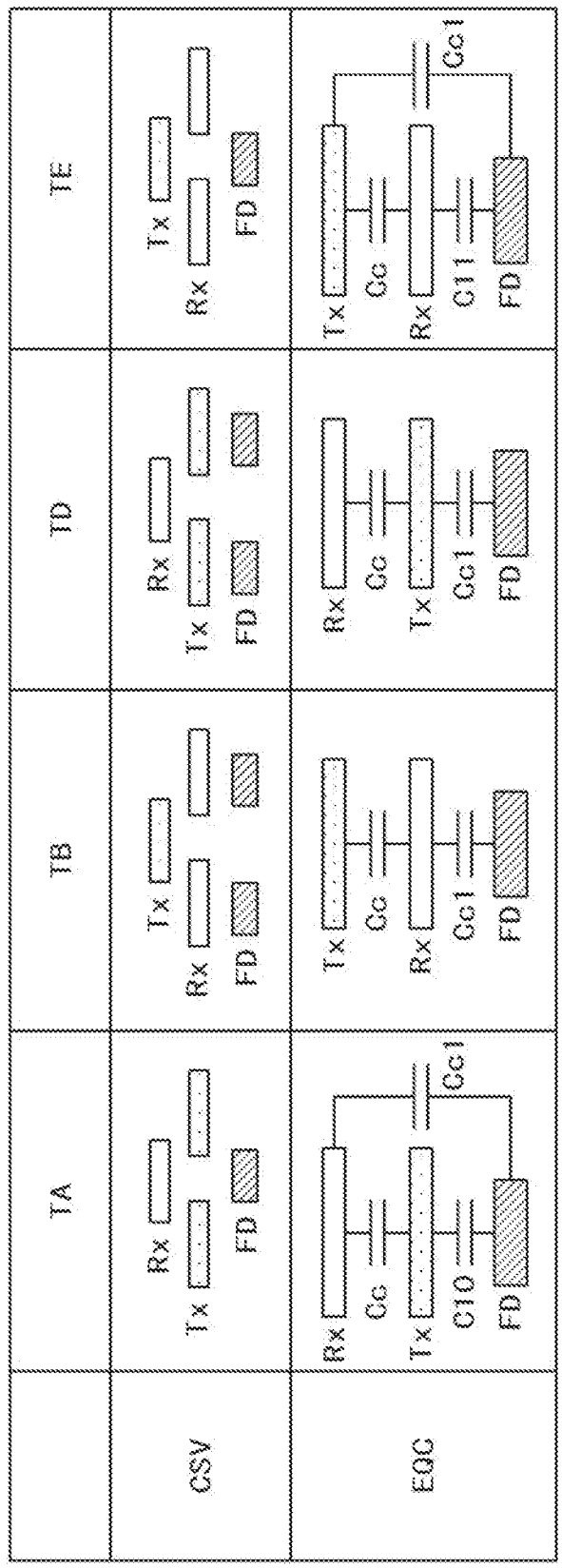
FIG. 26 is a diagram collectively illustrating cross-sectional views of types TA, TB, TD, and TE and equivalent circuits of the types TA, TB, TD, and TE.

FIG. 26 is a diagram collectively illustrating cross-sectional views CSV of the types TA, TB, TD, and TE and equivalent circuits EQC of the types TA, TB, TD, and TE.

In the type TA, as indicated by the equivalent circuit EQC, a capacitor C10 exists between the second detection electrode FD and the driving electrode Tx, a coupling capacitor Cc exists between the driving electrode Tx and the detection electrode Rx, and a coupling capacitor Cc1 exists between the second detection electrode FD and the detection electrode Rx.

In the type TB, as indicated by the equivalent circuit EQC, the coupling capacitor Cc1 exists between the second detection electrode FD and the detection electrode Rx, and the coupling capacitor Cc exists between the detection electrode Rx and the driving electrode Tx.

In the type TD, as indicated by the equivalent circuit EQC, the coupling capacitor Cc1 exists between the second detection electrode FD and the driving electrode Tx, and the coupling capacitor Cc exists between the driving electrode Tx and the detection electrode Rx.

In the type TE, a capacitor C11 exists between the second detection electrode FD and the driving electrode Tx, the coupling capacitor Cc exists between the detection electrode Rx and the driving electrode Tx, and the coupling capacitor Cc1 exists between the second detection electrode FD and the driving electrode Tx.

In the configuration example of the type TB, a load to be applied to the driving electrode Tx can be further reduced and the driving electrode Tx is easily driven. It is, therefore, possible to suppress rounding of the waveform of the driving signal Sig to drive the driving electrodes Tx.

Figure 27:
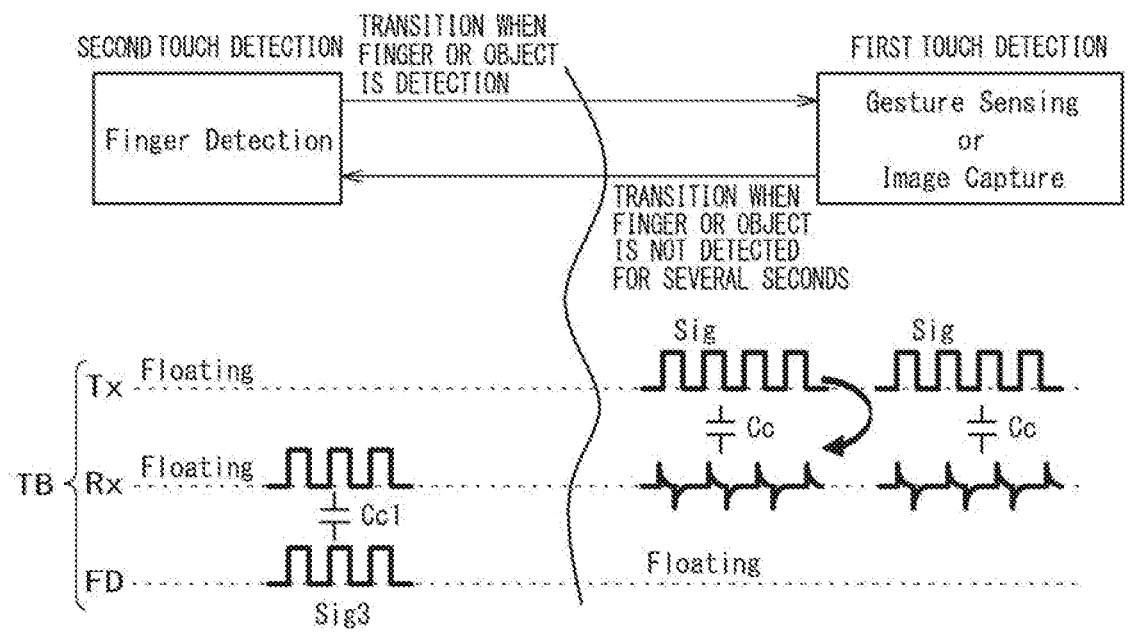
FIG. 27 is a diagram describing a driving method of the type TB illustrated in FIG. 26.

FIG. 27 is a diagram describing a driving method for the type TB illustrated in FIG. 26. As illustrated in FIG. 27, in the second touch detection, the driving electrodes Tx and the detection electrodes Rx are floated. In this state, the second detection electrodes FD are driven by the self-detection driving pulse Sig3 based on the self-detection. The second detection electrodes FD and the detection electrodes Rx are coupled to each other via the coupling capacitors Cc1, and the detection electrodes Rx are driven by a signal with the same phase as the self-detection driving pulse Sig3. Therefore, whether an external approaching object such as a finger or a pen approaches a region near the touch sensor area TPA is detected.

When it is detected that the external approaching object such as the finger or the pen approaches a region near the touch sensor area TPA in the second touch detection, the touch panel TP transitions to the first touch detection. In the first touch detection, the second detection electrodes FD are floated. In subsequent operations, as described with reference to FIG. 11, in a detection period for the first touch detection, the driving electrodes Tx are sequentially driven by the driving pulse (Sig) based on the mutual detection method, and a pulse-like waveform based on fringe components is obtained for the detection electrodes Rx. When an external approaching object such as a finger or a pen is not detected on the touch sensor area TPA for several seconds, it is determined that the external approaching object such as the finger or the pen is not detected, and the touch panel TP transitions from the operation of the first touch detection to the operation of the second touch detection.

It is desirable that the same driving as described with reference to FIG. 27 be performed for the type TC illustrated in FIG. 23 and the type TE illustrated in FIGS. 23 and 26.

Figure 28:
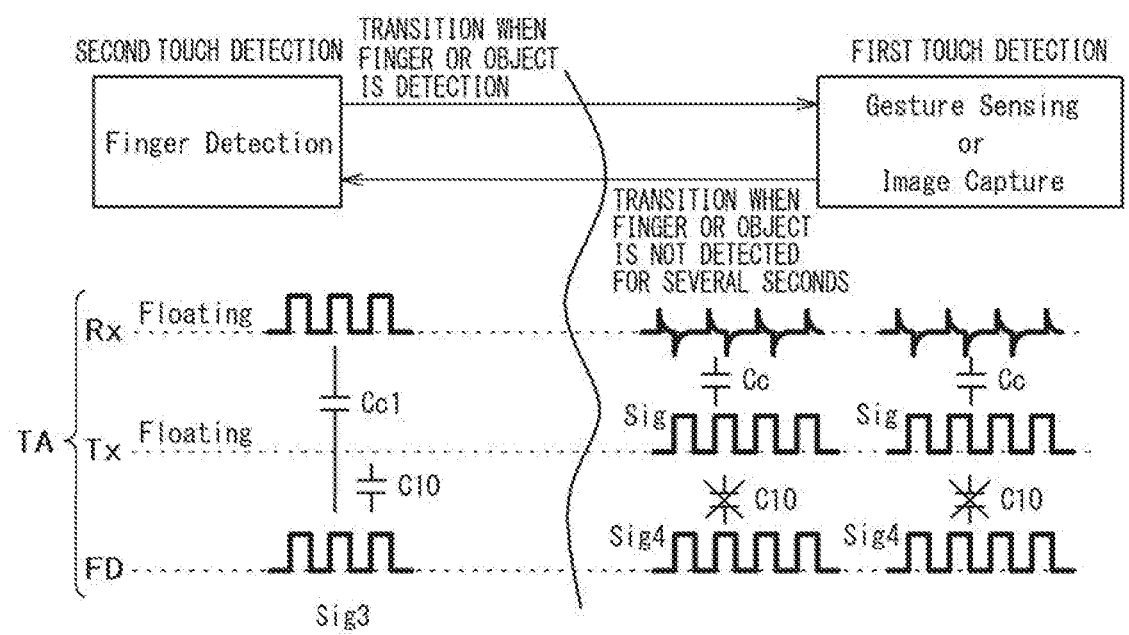
FIG. 28 is a diagram describing a driving method of the type TA illustrated in FIG. 26.

FIG. 28 is a diagram describing a driving method for the type TA illustrated in FIG. 26. FIG. 28 illustrates an example of a method of driving the second detection electrodes FD using a driving pulse Sig4 with the same amplitude as the driving electrodes Tx for a detection period for the first touch detection. In the type TA, capacitors C10 exist between the second detection electrodes FD and the driving electrodes Tx, but an effect of the capacitors C10 between the second detection electrodes FD and the driving electrodes Tx can be offset or reduced by driving the second detection electrodes FD using the driving pulse Sig4 with the same amplitude as the driving electrodes Tx. Other operations in FIG. 28 are the same as those described with reference to FIG. 27 and will not be described.

In the type TF illustrated in FIG. 24 and the type TD illustrated in FIG. 26, an effect of the capacitors Cc1 between the second detection electrodes FD and the driving electrodes Tx can be offset or reduced by performing the same driving as the driving method described with reference to FIG. 28.

Ninth Modification Example

Figure 29:
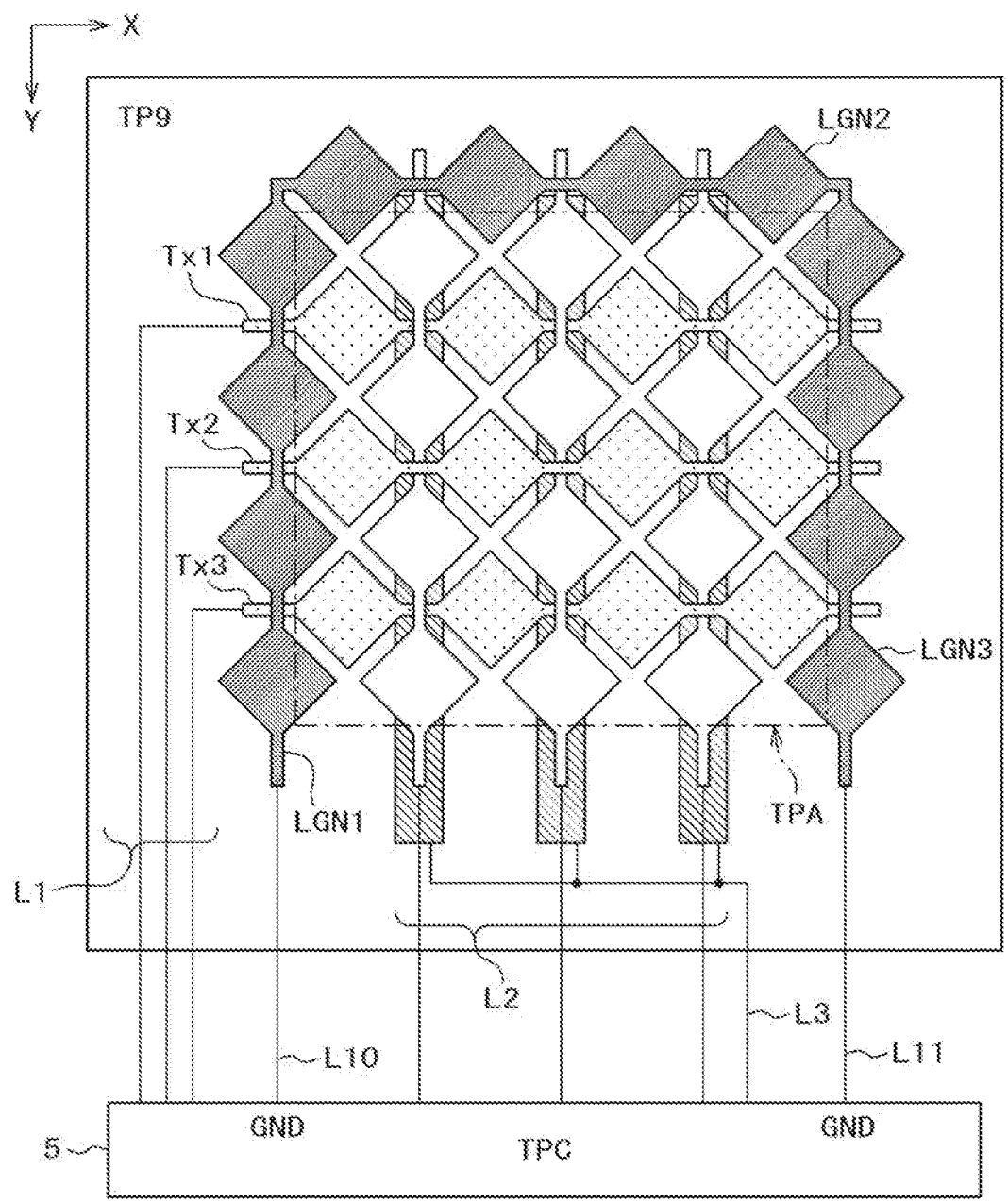
FIG. 29 is a diagram describing a planar layout of a touch panel according to a ninth modification example.
Figure 30:
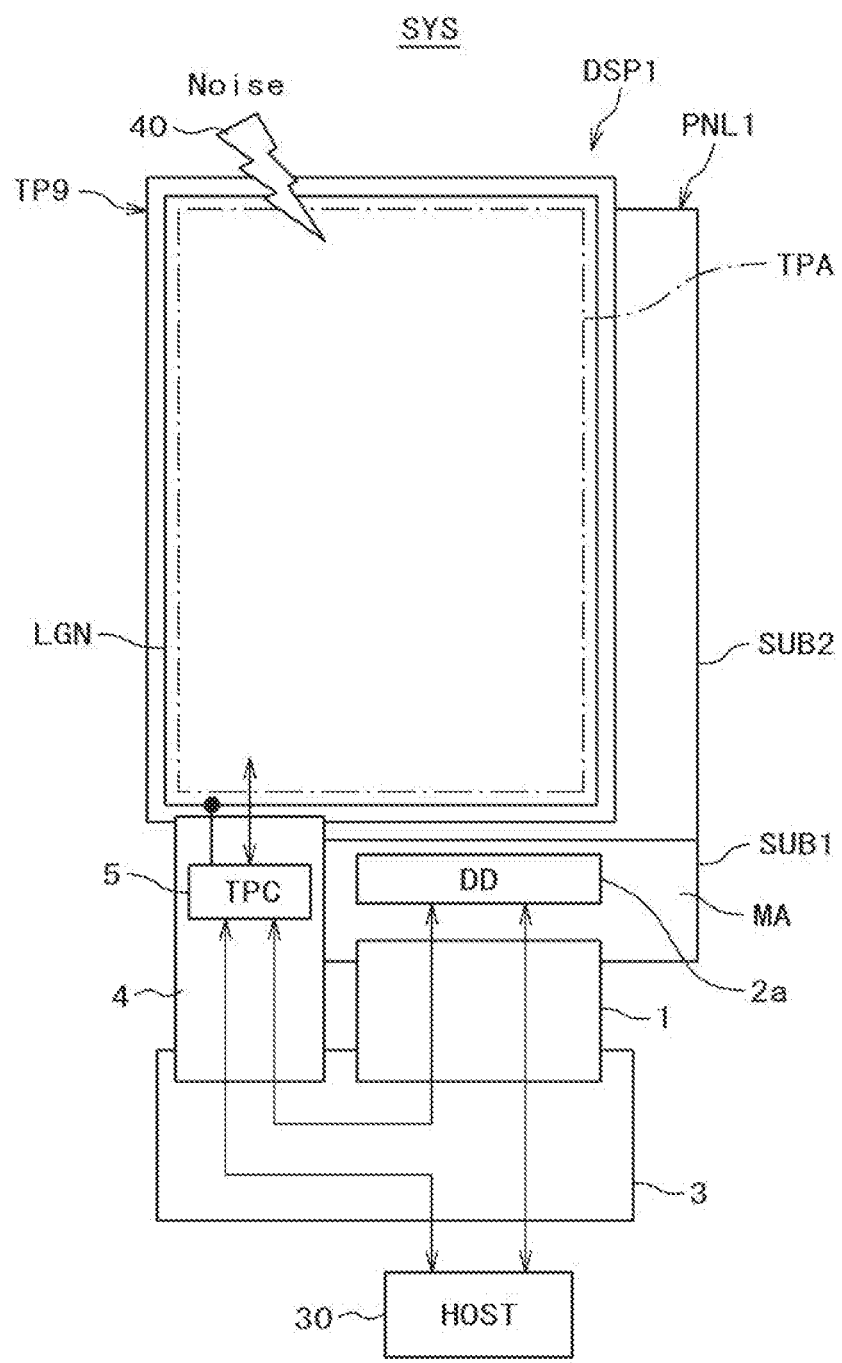
FIG. 30 is a diagram describing a configuration example of an electronic device according to the ninth modification example.

FIG. 29 is a diagram describing a planar layout of a touch panel TP9 according to a ninth modification example. FIG. 30 is a diagram illustrating a configuration example of an electronic device SYS according to the ninth modification example.

As illustrated in FIG. 29, the touch panel TP9 is different from the touch panel TP illustrated in FIG. 5 in that the touch panel TP9 includes electrodes LGN (LGN1, LGN2, and LGN3) to which a ground potential GND is supplied. The electrodes LGN (LGN1, LGN2, and LGN3) can be referred to as ground lines. The electrodes LGN (LGN1, LGN2, and LGN3) surround the driving electrodes Tx (Tx1, Tx2, and Tx3), the detection electrodes Rx (Rx1, Rx2, and Rx3), and the second detection electrodes FD (FD1, FD2, and FD3) in a plan view.

The electrodes LGN include the three electrodes LGN1, LGN2, and LGN3. The electrode LGN1 extends in the second direction Y. An end of the electrode LGN1 is connected to the touch panel control device (TPC) 5 via a lead line L10. The ground potential GND is supplied from the touch panel control device 5 to the electrode LGN1. The electrode LGN2 extends in the first direction X. An end of the electrode LGN2 is connected to the other end of the electrode LGN1. The electrode LGN3 extends in the second direction Y. An end of the electrode LGN3 is connected to the touch panel control device 5 via a lead line L11. The ground potential GND is supplied from the touch panel control device 5 to the electrode LGN3. Each of the electrodes LGN1, LGN2, and LGN3 is formed in the same shape as the shape described with reference to FIG. 6 or 7.

The other end of the electrode LGN3 is connected to the other end of the electrode LGN2. The electrode LGN1 is arranged on the left side of the driving electrodes Tx, the detection electrodes Rx, and the second detection electrodes FD in a plan view. The electrode LGN2 is arranged on the upper side of the driving electrodes Tx, the detection electrodes Rx, and the second detection electrodes FD in the plan view. The electrode LGN3 is arranged on the right side of the driving electrodes Tx, the detection electrodes Rx, and the second detection electrodes FD in the plan view. Therefore, the left, upper, and right sides of the driving electrodes Tx, the detection electrodes Rx, and the second detection electrodes FD are surrounded by the electrodes LGN1, LGN2, and LGN3. Specifically, the left, upper, and right sides of the touch sensor area TPA of the touch panel TP9 are covered by the electrodes LGN (LGN1, LGN2, and LGN3) to which the ground potential GND is supplied. The electrodes LGN may be connected to a ground line included in the flexible printed circuit board 4.

According to this configuration, for example, even when noise is applied to the touch sensor area TPA of the touch panel TP9, an effect of the noise can be reduced by the electrodes LGN, and the accuracy of the first and second touch detection can be improved.

As illustrated in FIG. 30, the electronic device SYS includes a host device 30 and a display device DSP1. The display device DSP1 includes a display panel PNL1, the touch panel TP9, the flexible printed circuit board 1, an IC chip (DD) 2a, the circuit board 3, the flexible printed circuit board 4, and the touch panel control device 5. The display panel PNL1 has the same configuration as that illustrated in FIG. 1 and will not be described in detail. In this example, the touch panel TP9 includes the electrodes LGN surrounding the touch sensor area TPA. The configuration illustrated in FIG. 29 and the configurations described in the embodiment and the first to eighth modification examples can be used for the driving electrodes Tx, the detection electrodes Rx, and the second detection electrodes FD that are installed in the touch sensor area TPA of the touch panel TP9.

The flexible printed circuit board 1 is mounted on the mounting area MA and connected to the circuit board 3. The IC chip 2a is mounted on the mounting area MA. The IC chip 2a includes a display driver DD for outputting a signal necessary to display an image in a display mode for displaying an image.

The flexible printed circuit board 4 is mounted between the touch panel TP9 and the circuit board 3. The touch panel control device 5 is mounted on the flexible printed circuit board 4 and electrically connected to the touch panel TP9. The touch panel control device 5 is electrically connected to the IC chip 2a via the flexible printed circuit board 4, the circuit board 3, and the flexible printed circuit board 1.

The host device 30 is electrically connected to the IC chip 2a via the circuit board 3 and the flexible printed circuit board 1. The host device 30 is electrically connected to the touch panel control device 5 via the circuit board 3 and the flexible printed circuit board 4.

In this example, the electrodes LGN are electrically connected to the touch panel control device 5 via the flexible printed circuit board 4. The ground potential GND is supplied from the touch panel control device 5 to the electrodes LGN.

As illustrated in FIG. 30, the case where noise 40 is applied to the touch sensor areas TPA of the touch panel TP9 is considered. In this case, the noise 40 is divided into a first component that flows to the electrodes LGN and a second component that flows to the IC chip 2a via the flexible printed circuit board 4, the circuit board 3, and the flexible printed circuit board 1. If the electrodes LGN do not exist, the noise 40 flows to the IC chip 2a via the flexible printed circuit board 4, the circuit board 3, and the flexible printed circuit board 1.

Therefore, by arranging the electrodes LGN, the component of the noise 40 that flows toward the IC chip 2a can be reduced. This can improve noise resistance and static resistance of the electronic device SYS.

The electrodes LGN can be connected to ground lines included in the flexible printed circuit board 4, the circuit board 3, and the flexible printed circuit board 1. The ground lines can also be electrically connected to ground terminals of the IC chip 2a.

All display devices and touch detection devices that can be obtained by changing the design by a person skilled in the art based on the display device described in the embodiment of the present invention and the touch detection device described in the embodiment of the present invention belong to the scope of the present invention as long as the display devices and the touch detection devices include the gist of the present invention.

Various change examples and modification examples can be conceived by persons skilled in the art in the category of the idea of the present invention. It is understood that the change examples and the modification examples also belong to the scope of the present invention. For example, a constituent element that is appropriately added or deleted by a person skilled in the art with respect to the foregoing embodiment or the design of a constituent element that is appropriately changed by a person skilled in the art, or a process that is appropriately added or deleted by a person skilled in the art with respect to the foregoing embodiment or the design of a process that is appropriately changed by a person skilled in the art with respect to the embodiment, is included in the scope of the present invention as long as the constituent element or the process includes the gist of the present invention.

It is understood that other effects that are obtained by the aspects described in the embodiment and clarified from the present specification or effects that can be appropriately conceived by a person skilled in the art are obtained from the present invention.

The present invention can be variously modified by appropriately combining constituent elements disclosed in the embodiment. For example, some constituent elements may be removed from all the constituent elements described in the embodiment. In addition, constituent elements described in the embodiment and one or more of the modification examples may be combined.

What is claimed is:

1. A display device comprising:
   a first detection electrode that detects a position of an external approaching object within a detection surface; and
   a plurality of second detection electrodes that detect that the external approaching object approaches the detection surface,
   wherein the second detection electrodes extend in a second direction and are arranged in a first direction intersecting the second direction,
   the second detection electrodes overlap the first detection electrode in a plan view, and
   the second detection electrodes are driven with same amplitude as driving electrodes in first touch detection using the first detection electrode,
   wherein touch detection is performed by the first detection electrode only after the external approaching object is detected by the second detection electrodes, and
   wherein the first detection electrode has a pad portion and a connection line portion thinner than the pad portion, and the connection line portion of the first touch detection electrode overlaps with the second touch detection electrode, and the second touch detection electrode is narrower than the pad portion of the first detection electrode, and the second touch detection electrode is wider than the connection line portion of the first detection electrode, and the second touch detection electrode overlaps both the connection line portion and the pad portion of the first touch detection electrode.

2. The display device according to claim 1,
   wherein the first detection electrode includes a plurality of driving electrodes and a plurality of detection electrodes, and
   areas of portions included in the second detection electrodes and overlapping the detection electrodes are larger than areas of portions included in the second detection electrodes and overlapping the driving electrodes.

3. The display device according to claim 2, wherein the driving electrodes, the detection electrodes, and the second detection electrodes are arranged in the order of the plurality of detection electrodes, the plurality of driving electrodes, and the plurality of second detection electrodes from the detection surface in a cross-sectional view.

4. The display device according to claim 1, wherein the plurality of second detection electrodes are floated in first touch detection using the first detection electrode.

5. The display device according to claim 4, wherein the plurality of driving electrodes and the plurality of detection electrodes are floated in second touch detection using the plurality of second detection electrodes.

6. The display device according to claim 1,
   wherein each of the plurality of driving electrodes and the plurality of detection electrodes has a structure in which corners of a plurality of squares are joined to each other, and
   the plurality of driving electrodes partially overlap the plurality of detection electrodes in the plan view.

7. The display device according to claim 6,
   wherein the plurality of second detection electrodes have a stripe-shaped electrode structure, and
   the stripe-shaped electrodes overlap the corners of the plurality of squares.

8. A display device comprising:
   a first detection electrode that detects a position of an external approaching object within a detection surface; and
   a plurality of second detection electrodes that detect that the external approaching object approaches the detection surface,
   wherein the second detection electrodes extend in a second direction and are arranged in a first direction intersecting the second direction,
   the second detection electrodes overlap the first detection electrode in a plan view,
   the first detection electrode includes a plurality of driving electrodes and a plurality of detection electrodes,
   the areas of portions included in the second detection electrodes and overlapping the driving electrodes are larger than the areas of portions included in the second detection electrodes and overlapping the detection electrodes,
   the driving electrodes, the detection electrodes, and the second detection electrodes are arranged in the order of the driving electrodes, the detection electrodes, and the second detection electrodes from the detection surface in a cross-sectional view, and
   the second detection electrodes are driven with same amplitude as the driving electrodes in first touch detection using the first detection electrode,
   wherein touch detection is performed by the first detection electrode only after the external approaching object is detected by the second detection electrodes, and
   wherein the first detection electrode has a pad portion and a connection line portion thinner than the pad portion, and the connection line portion of the first touch detection electrode overlaps with the second touch detection electrode, and the second touch detection electrode is narrower than the pad portion of the first detection electrode, and the second touch detection electrode is wider than the connection line portion of the first detection electrode, and the second touch detection electrode overlaps both the connection line portion and the pad portion of the first touch detection electrode.

9. A touch detection device comprising:
   a first detection electrode that detects a position of an external approaching object within a detection surface; and a plurality of second detection electrodes that detect that the external approaching object approaches the detection surface,
wherein the second detection electrodes extend in a second direction and are arranged in a first direction intersecting the second direction,
each of the second detection electrodes overlaps the first detection electrode in a plan view, and
the second detection electrodes are driven with same amplitude as driving electrodes in first touch detection using the first detection electrode,
wherein touch detection is performed by the first detection electrode only after the external approaching object is detected by the second detection electrodes, and
wherein the first detection electrode has a pad portion and a connection line portion thinner than the pad portion, and the connection line portion of the first touch detection electrode overlaps with the second touch detection electrode, and the second touch detection electrode is narrower than the pad portion of the first detection electrode, and the second touch detection electrode is wider than the connection line portion of the first detection electrode, and the second touch detection electrode overlaps both the connection line portion and the pad portion of the first touch detection electrode.

10. The touch detection device according to claim 9, wherein the first detection electrode includes a plurality of driving electrodes and a plurality of detection electrodes, and
areas of portions included in the second detection electrodes and overlapping the detection electrodes are larger than areas of portions included in the second detection electrodes and overlapping the driving electrodes.

11. The touch detection device according to claim 10, wherein the plurality of driving electrodes, the plurality of detection electrodes, and the plurality of second detection electrodes are arranged in the order of the detection electrodes, the driving electrodes, and the second detection electrodes from the detection surface in a cross-sectional view.

12. The touch detection device according to claim 9, wherein the plurality of second detection electrodes are floated in first touch detection using the first detection electrode.

13. The touch detection device according to claim 12, wherein the plurality of driving electrodes and the plurality of detection electrodes are floated in second touch detection using the plurality of second detection electrodes.

14. The touch detection device according to claim 9, wherein each of the plurality of driving electrodes and the plurality of detection electrodes has a structure in which corners of a plurality of squares are joined to each other in the plan view.

15. The touch detection device according to claim 14, wherein the plurality of second detection electrodes have a stripe-shaped electrode structure, and
the stripe-shaped electrodes overlap the corners of the squares.

16. A touch detection device comprising:
a first detection electrode that detects a position of an external approaching object within a detection surface; and
a plurality of second detection electrodes that detect that the external approaching object approaches the detection surface,
wherein the second detection electrodes extend in a second direction and are arranged in a first direction intersecting the second direction,
each of the second detection electrodes overlaps the first detection electrode in a plan view,
the first detection electrode includes a plurality of driving electrodes and a plurality of detection electrodes,
areas of portions included in the second detection electrodes and overlapping the driving electrodes are larger than area of portions included in the second detection electrodes and overlapping the detection electrodes,
the driving electrodes, the detection electrodes, and the second detection electrodes are arranged in the order of the driving electrodes, the detection electrodes, and the second detection electrodes from the detection surface in a cross-sectional view, and
the second detection electrodes are driven with the same amplitude as the driving electrodes in first touch detection using the first detection electrode,
wherein touch detection is performed by the first detection electrode only after the external approaching object is detected by the second detection electrodes, and
wherein the first detection electrode has a pad portion and a connection line portion thinner than the pad portion, and the connection line portion of the first touch detection electrode overlaps with the second touch detection electrode, and the second touch detection electrode is narrower than the pad portion of the first detection electrode, and the second touch detection electrode is wider than the connection line portion of the first detection electrode, and the second touch detection electrode overlaps both the connection line portion and the pad portion of the first touch detection electrode.

17. A display device comprising:
a plurality of first detection electrodes that detect a position of an external approaching object within a detection surface; and
a plurality of second detection electrodes that detect that the external approaching object approaches the detection surface,
wherein the second detection electrodes extend in a second direction and are arranged in a first direction intersecting the second direction,
the second detection electrodes overlap the first detection electrode in a plan view,
the plurality of second detection electrodes are floated in first touch detection using the first detection electrode, and
the plurality of first detection electrodes are floated in second touch detection using the plurality of second detection electrodes,
wherein touch detection is performed by the first detection electrode only after the external approaching object is detected by the second detection electrodes, and
wherein the first detection electrode has a pad portion and a connection line portion thinner than the pad portion, and the connection line portion of the first touch detection electrode overlaps with the second touch detection electrode, and the second touch detection electrode is narrower than the pad portion of the first detection electrode, and the second touch detection electrode is wider than the connection line portion of the first detection electrode, and the second touch detection electrode overlaps both the connection line portion and the pad portion of the first touch detection electrode.

\* \* \* \* \*